United States Patent
Manglani et al.

(10) Patent No.: US 11,907,160 B2
(45) Date of Patent: Feb. 20, 2024

(54) DISTRIBUTED PROCESSOR SYSTEM

(71) Applicant: Analog Devices, Inc., Wilmington, MA (US)

(72) Inventors: Manish J. Manglani, Apex, NC (US); Shipra Bhal, Burlington, MA (US); Christopher Mayer, Dover, MA (US)

(73) Assignee: Analog Devices, Inc., Wilmington, MA (US)

( * ) Notice: Subject to any disclaimer, the term of this patent is extended or adjusted under 35 U.S.C. 154(b) by 0 days.

(21) Appl. No.: 17/817,811

(22) Filed: Aug. 5, 2022

(65) Prior Publication Data

US 2022/0374389 A1 Nov. 24, 2022

Related U.S. Application Data

(60) Continuation of application No. 16/913,251, filed on Jun. 26, 2020, now Pat. No. 11,422,969, which is a
(Continued)

(51) Int. Cl.
*G06F 9/30* (2018.01)
*G06F 15/82* (2006.01)
(Continued)

(52) U.S. Cl.
CPC .......... *G06F 15/82* (2013.01); *G06F 9/30123* (2013.01); *G06F 9/3877* (2013.01); *G06F 13/24* (2013.01); *G06F 15/80* (2013.01)

(58) Field of Classification Search
CPC .... G06F 15/82; G06F 9/30123; G06F 9/3877; G06F 13/24; G06F 15/80
See application file for complete search history.

(56) References Cited

U.S. PATENT DOCUMENTS

| 4,328,543 A | * | 5/1982 | Brickman ............... G06F 13/00 710/316 |
| 4,516,199 A | | 5/1985 | Frieder et al. |

(Continued)

FOREIGN PATENT DOCUMENTS

| CN | 201503637 U | 6/2010 |
| CN | 202574029 U | 12/2012 |

(Continued)

OTHER PUBLICATIONS

Lee, et al., "A Design of a GP-GPU based Stream Processor for an Image Processing," 2015 38$^{th}$ International Conference on Telecommunications and Signal Processing (TSP), IEEE 2015, pp. 535-539.
(Continued)

*Primary Examiner* — Corey S Faherty
(74) *Attorney, Agent, or Firm* — Knobbe, Martens, Olson & Bear, LLP

(57) ABSTRACT

This disclosure relates to a distributed processing system for configuring multiple processing channels. The distributed processing system includes a main processor, such as an ARM processor, communicatively coupled to a plurality of co-processors, such as stream processors. The co-processors can execute instructions in parallel with each other and interrupt the ARM processor. Longer latency instructions can be executed by the main processor and lower latency instructions can be executed by the co-processors. There are several ways that a stream can be triggered in the distributed processing system. In an embodiment, the distributed processing system is a stream processor system that includes an ARM processor and stream processors configured to access different register sets. The stream processors can include a main stream processor and stream processors in respective transmit and receive channels. The stream processor system
(Continued)

can be implemented in a radio system to configure the radio for operation.

16 Claims, 14 Drawing Sheets

Related U.S. Application Data division of application No. 16/103,711, filed on Aug. 14, 2018, now Pat. No. 10,733,141.

(60) Provisional application No. 62/648,842, filed on Mar. 27, 2018.

(51) Int. Cl.
*G06F 13/24* (2006.01)
*G06F 9/38* (2018.01)
*G06F 15/80* (2006.01)

(56) References Cited

U.S. PATENT DOCUMENTS

| | | | |
|---|---|---|---|
| 5,125,095 A | 6/1992 | Nakazawa et al. | |
| 7,523,209 B1* | 4/2009 | Treichler | H04L 12/4625 |
| | | | 709/228 |
| 8,971,210 B1 | 3/2015 | Murali et al. | |
| 9,064,496 B1 | 6/2015 | Wu | |
| 9,990,204 B2 | 6/2018 | McConnell et al. | |
| 10,733,141 B2 | 8/2020 | Manglani et al. | |
| 11,422,969 B2 | 8/2022 | Manglani et al. | |
| 2002/0015401 A1* | 2/2002 | Subramanian | H04L 27/0008 |
| | | | 370/332 |
| 2002/0091826 A1 | 7/2002 | Comeau et al. | |
| 2002/0133689 A1 | 9/2002 | Park et al. | |
| 2005/0119025 A1* | 6/2005 | Mohindra | H04B 1/0021 |
| | | | 455/88 |
| 2006/0271764 A1* | 11/2006 | Nilsson | G06F 9/30014 |
| | | | 712/34 |
| 2007/0300042 A1 | 12/2007 | Moyer et al. | |
| 2009/0260013 A1 | 10/2009 | Heil et al. | |
| 2010/0284450 A1* | 11/2010 | Ejima | H04B 1/713 |
| | | | 375/345 |
| 2013/0318329 A1 | 11/2013 | Takeuchi et al. | |
| 2013/0331954 A1 | 12/2013 | McConnell et al. | |
| 2016/0226468 A1 | 8/2016 | Ge et al. | |
| 2017/0222849 A1 | 8/2017 | Shimura | |
| 2017/0278213 A1 | 9/2017 | Eckert et al. | |
| 2017/0315812 A1 | 11/2017 | Smith et al. | |
| 2019/0034206 A1 | 1/2019 | Sane et al. | |
| 2019/0303348 A1 | 10/2019 | Manglani et al. | |

FOREIGN PATENT DOCUMENTS

| | | |
|---|---|---|
| CN | 205453777 U | 8/2016 |
| EP | 0 685 798 | 12/1995 |

OTHER PUBLICATIONS

Ramacher, Ulrich, "Software-Defined Radio Prospects for Multistandard Mobile Phones," IEEE Computer Society, Oct. 2007, pp. 62-69.
Feitelson, et al., "Distributed Hierarchical Control for Parallel Processing," IEEE Computer, vol. 23, Issue 5, May 1990, pp. 65-77.
Extended European Search Report for European Patent Application No. 19776540 dated Jun. 7, 2021.
International Search Report dated Jul. 2, 2019 for International Application No. PCT/US2019/023816.
Written Opinion dated Jul. 2, 2019 for International Application No. PCT/US2019/023816.
Drozdenko et al., "Hardware-Software Codesign of Wireless Transceivers on Zynq Heterogeneous Systems", IEEE Transactions on Emerging Topics in Computing, Jan. 17, 2017, 6(4): 566-578.
Communication pursuant to Article 94(3) EPC, issued in European Application No. 19776540.7, dated May 10, 2023.
Office Action issued in Chinese Application No. 201980022802.3, dated Aug. 18, 2023.

* cited by examiner

DISTRIBUTED PROCESSOR SYSTEM

CROSS-REFERENCE TO RELATED APPLICATIONS

This application is a continuation of U.S. patent application Ser. No. 16/913,251, filed Jun. 26, 2020, titled "DISTRIBUTED PROCESSOR SYSTEM," which is a divisional of U.S. patent application Ser. No. 16/103,711, filed Aug. 14, 2018, titled "DISTRIBUTED PROCESSOR SYSTEM," which claims the benefit of priority under 35 U.S.C. § 119(e) of U.S. Provisional Patent Application No. 62/648,842, filed Mar. 27, 2018, titled "STREAM PROCESSOR SYSTEM," the disclosures of each of which are hereby incorporated by reference in their entireties.

FIELD OF DISCLOSURE

The described technology generally relates to electronics and, more specifically, to processors.

BACKGROUND

Certain electronic systems can include a plurality of processing channels. For example, processing channels in radio systems can include transmit channels and receive channels. As electronic systems are being scaled up to include more processing channels, controlling the various processing channels can become more difficult. Some previous ways of configuring the processing channels can encounter difficulties in scaling for electronic systems that include more processing channels. Such difficulties can include increased design complexity, among other things.

SUMMARY OF THE DISCLOSURE

The innovations described in the claims each have several aspects, no single one of which is solely responsible for its desirable attributes. Without limiting the scope of the claims, some prominent features of this disclosure will now be briefly described.

One aspect of this disclosure is a distributed processing system for configuring multiple processing channels. The distributed processing system includes a main processor configured to execute main processor instructions and a plurality of processing channels. Each of the processing channels includes registers configured to store data, a co-processor, and a trigger interface. The co-processor is configured to execute co-processor instructions that have a lower latency than the main processor instructions, and to receive a trigger from the main processor that causes the co-processor to execute a first set of instructions of the co-processor instructions. The co-processor instructions include at least one instruction to access at least one of the registers. The trigger interface is configured to receive an input signal from external to the distributed processing system and to cause the co-processor to execute a second set of instructions of the co-processor instructions in response to receiving the input signal.

The distributed processing system can further include a main co-processor in communication with the main processor and each of the co-processors. The main co-processor can trigger a stream in each of the co-processors in the processing channels. The main co-processor can have access to registers of each of the processing channels. The main co-processor can be in communication with the trigger interface in each of the processing channels. The main co-processor can provide an interrupt to the main processor. The main co-processor can queue multiple requests for the co-processors of the processing channels. The processing channels can include transmit channels of a radio and receive channels of the radio, and the registers in the processing channels can configure the radio for operation.

The distributed processing system can receive a high level command and write to at least one hundred registers in the processing channels in response to receiving the high level command. The high level command can be a turn on channel command, and the distributed processing system is configured to implement a startup process in response to receiving the turn on channel command.

Each of the co-processors of the processing channels can provide an interrupt to the main processor via a dedicated signal line. Each of the co-processors of the processing channels can execute instructions in parallel with each other.

The main processor can be an advanced reduced instruction set machine computer (ARM) processor. The co-processor in each processing channel can be a stream processor.

Radio registers in a channel can be used to configure analog circuit blocks of a receive channel or a transmit channel. The analog circuit components can be included in a transmitter of a radio. The processing channels can include receive channels of a radio and transmit channels of the radio.

Each of the co-processors of the processing channels can include dedicated circuitry configured to execute a timing sensitive instruction of the co-processor instructions. Each of the co-processors can be re-configurable.

The distributed processing system can be implemented on a monolithic integrated circuit.

Another aspect of this disclosure is a method of configuring a radio with a distributed processing system that includes a plurality of radio channels and a main processor. The method includes triggering a stream in a co-processor of a radio channel of the radio channels, wherein the co-processor is in communication with the main processor, and wherein the co-processor is configured to access resisters of the radio channel; executing the stream in the co-processor to at least set a value in a register of the registers of the radio channel, wherein the value in the register is configured to control a radio operation of the radio; and providing, by the co-processor, a return in response to completing the stream.

The method can further include executing a second stream in a second co-processor of a second radio channel of the radio channels concurrent with executing the stream in the co-processor.

The triggering can be in response to an input signal received by a trigger interface of the radio channel from a baseband processor that is external to the distributed processing system. The main processor can provide a trigger for the triggering. A main co-processor can provide a trigger for the triggering, in which the main co-processor is in communication with the main processor, the co-processor and other co-processors in other radio channels of the radio channels.

The method can further include providing an interrupt to the main processor via a dedicated signal line in response to the executing.

Another aspect of this disclosure is a stream processing system for configuring processing channels of a radio system. The stream processing system includes transmit channels, receive channels, a main stream processor, and an advanced reduced instruction set machine computer (ARM) processor. Each of the transmit channels includes transmit registers and a transmit channel stream processor. The transmit registers are arranged to configure a transmitter of the radio for operation. Each of the receive channels includes receive registers and a receive channel stream processor. The receive registers are arranged to configure a receiver of the radio for operation. The main stream processor is configured to trigger streams in the transmit channel stream processor of each of the transmit channels and the receive channel stream processor of each of the receive channel stream processors. The ARM processor is communicatively coupled with the main stream processor, the transmit channel stream processor of each of the transmit channels, and the receive channel stream processor of each of the receive channel stream processors.

Each of the transmit channels can include a stream trigger interface configured to receive an input signal from external to the stream processing system and to trigger a stream in the respective transmit channel stream processor.

Each of the transmit channel stream processors and each of the receive channel stream processors can provide an interrupt to the ARM processor.

The ARM processor can execute higher latency instructions and the transmit channel stream processors can execute lower latency instructions that have a lower latency than the high latency instructions.

The transmit channels can include at least four transmit channels and the receive channels can include at least four receive channels.

Each of the transmit channel stream processors can include dedicated circuitry configured to execute a timing sensitive instruction.

For purposes of summarizing the disclosure, certain aspects, advantages and novel features of the innovations have been described herein. It is to be understood that not necessarily all such advantages may be achieved in accordance with any particular embodiment. Thus, the innovations may be embodied or carried out in a manner that achieves or optimizes one advantage or group of advantages as taught herein without necessarily achieving other advantages as may be taught or suggested herein.

BRIEF DESCRIPTION OF THE DRAWINGS

The drawings and the associated description herein are provided to illustrate specific embodiments of the disclosure and are not intended to be limiting.

DETAILED DESCRIPTION

Figure 1:
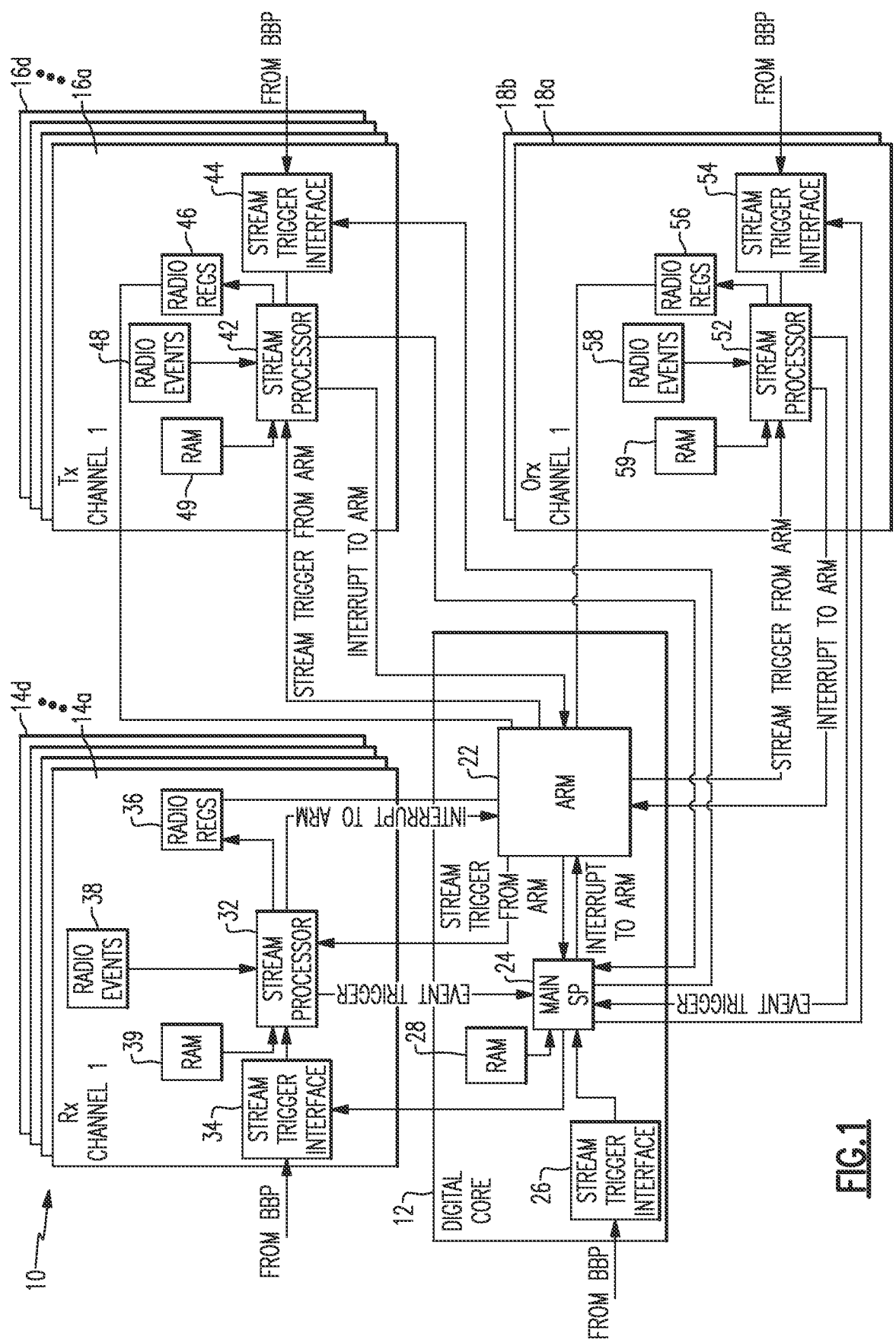
FIG. 1 is a schematic block diagram of an example stream processor system for radio applications according to an embodiment.

The following detailed description presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings. The headings provided herein are for convenience only and do not necessarily affect the scope or meaning of the claims.

The disclosed technology relates to a stream processor system that includes parallel programmable processors, which can be referred to as stream processors or threads. Methods of controlling the stream processor system are also disclosed. Each of the stream processors can read, write, poll, and/or perform other suitable operations from different register sets. The stream processors can be implemented in a radio context, such as in a transceiver chip for a base station. The disclosed technology can also be applied to other applications, such as high speed converters (e.g., high speed analog-to-digital converters and/or high speed digital-to-analog converters). In the radio context, more and more radio frequency channels are being used. For example, some previous parts had 2 transmit (Tx) channels and 2 receive (Rx) channels. Some current designs are including 4 Tx channels and 4 Rx channels, and future parts may include 8 Tx channels and 8 Rx channels. The stream processing architecture described herein allows control functions, such as setting values in hardware registers to control radio operations, in such systems to be more scalable than existing solutions.

Aspects of this disclosure relate to a distributed processing system for configuring multiple processing channels. The distributed processing system includes a main processor, such as an advanced reduced instruction set computer machine (ARM) processor, configured to execute main processor instructions and a plurality of processing channels. Each of the processing channels can include a co-processor, such as a stream processor, configured to execute co-processor instructions. The co-processors can execute instructions having a lower latency than the main processor instructions.

Each of the co-processors can execute a set of instructions received in response to a trigger received at a respective trigger interface. The trigger interface can receive and input signal from external to the distributed processing system, such as from a baseband processor. The set of instructions can include an instruction to access a resister of a respective processing channel. The co-processors in the respective processing channels can receive another trigger from a main co-processor and/or an ARM processor and execute a different set of instructions in response to the other trigger. The co-processors can execute instructions in parallel with each other. Each of the co-processors can send an interrupt to the main processor. The interrupt can be provided via a dedicated signal line. The co-processors can be re-configurable.

The distributed processing system can be included in a radio system to configure radio channels for operation. This can involve configuring analog circuit components for processing a radio frequency signal. The processing channels can include transmit channels, receive channels, and observation receive channels. The distributed processing system can receive a high level command and write at least a hundred registers in the processing channels to be written in response to the high level command.

Although embodiments discussed herein may be described with reference to stream processors and an ARM processor, any suitable principles and advantages disclosed herein can be implemented in a distributed processing system that includes a main processor and co-processors. The main processor can execute instructions with longer latency and the co-processors can execute instructions with lower latency. For example, the main processor can be an ARM processor, such as an ARM M3 processor or an ARM M4 processor, and co-processors can execute instructions with lower latency than the instructions executed by the ARM processor. The main processor can execute more computation intensive instructions and the co-processors can execute less computation intensive instructions. The co-processors can be reconfigurable. Example co-processors include, but are not limited to, stream processors, any other suitable processors that can perform functions similar to some or all of the functionality of any of the stream processors disclosed herein, or the like. Example main processors, but are not limited to, ARM processors, any other suitable processors that can perform functions similar to some or all of the functionality of any of the ARM processors disclosed, or the like.

Stream Processor System

FIG. 1 is a schematic block diagram of an example stream processor system 10 for radio applications according to an embodiment. The stream processor system 10 can receive external commands and manage the timing of register transactions. A single command received by the stream processor system can trigger thousands of register writes in certain instances. Stream processors of the stream processor system 10 can manage real time control of registers. The stream processors of the stream processor system 10 can control radio events and channel enabling and/or disabling.

The stream processor system 10 of FIG. 1 includes a digital core 12, receive channels 14a to 14d, transmit channels 16a to 16d, and observation channels 18a to 18b. The digital core 12 includes an ARM processor 22, a main stream processor 24, a stream trigger interface 26 for the main stream processor 24, and memory 28 for the digital core 12. The stream trigger interface 26 can be any suitable interface, such as a serial peripheral interface (SPI). The stream trigger interface 26 can include any suitable digital circuitry.

The stream processor system 10 includes 11 stream processors that are all communicatively coupled to the ARM processor 22. The stream processor system 10 has a stream parallel processing arrangement. As illustrated in FIG. 1, the 11 stream processors can include 4 stream processors 32 for receive channels 14a to 14d, 4 stream processors 42 for transmit channels 16a to 16d, 2 stream processors 52 for observation channels 18a to 18b, and 1 main stream processor 24. The ARM processor 22 can be an M4 ARM processor, for example. The stream processors 24, 32, 42, and 52 and the ARM processor 22 can be implemented on a monolithic integrated circuit. A microcontroller can include the stream processors 24, 32, 42, and 52 and the ARM processor 22. A transceiver integrated circuit can include the illustrated stream processor system 10.

As shown in FIG. 1, all of the 11 stream processors 24, 32, 42, and 52 are connected to the ARM processor 22. The stream processors 24, 32, 42, and 52 can communicate with the ARM processor 22 without data passing through an intermediate processor. Each of the stream processors 24, 32, 42, and 52 can be in communication with the ARM processor 22 by way of a dedicated signal line. As illustrated, each of the stream processors 24, 32, 42, and 52 has a dedicated signal line to provide an interrupt to the ARM processor 22. The stream processors 24, 32, 42, and 52 can receive respective stream triggers from the ARM processor 22. In addition, the 10 stream processors 32, 42, and 52 are also connected to the main stream processor 24. The 10 stream processors 32, 42, and 52 can receive triggers from the main stream processor 24.

The stream processors 32, 42, and 52 can be referred to as auxiliary stream processors or slice stream processors. Each of these stream processors is included in a processing channel, such as a transmit channel, a receive channel, or an observation channel. Each auxiliary stream processor 32, 42, and 52 can access the registers 36, 46, and 56, respectively, in its respective processing channel. As an example, a transmit slice processor 42 can access registers 46 that include transmit slice registers, transmit analog sub map registers, digital-to-analog converter (DAC) registers, the like, or suitable any combination thereof. To access registers in another processing channel or in the digital core 12, an auxiliary stream processor can trigger a corresponding stream in the main stream processor 24. For instance, a trigger mechanism in an auxiliary stream processor can provide a RETURN opcode to trigger a corresponding stream in the main stream processor 24. The auxiliary stream processors 32, 42, and 52 that can be controlled by the main stream processor 24.

The main stream processor 24 can be referred to as a core stream processor. The main stream processor 24 can have access to all hardware registers. Each of the auxiliary stream processors 32, 42, and 52 has access to a respective group of dedicated hardware registers. Each auxiliary stream processor 32, 42, and 52 can provide an interrupt to the ARM processor 22. Each auxiliary stream processor 32, 42, and 52 can provide an interrupt to the main stream processor 24. Each auxiliary stream processor 32, 42, 52 has a respective stream trigger interface 34, 44, 54 configured to receive a signal from a baseband processor, which can allow external access to an auxiliary stream processor 32, 42, 52. The stream trigger interface 34, 44, 54 for each auxiliary stream processor 32, 42, 52 can also receive a signal from the main stream processor 24. The stream trigger interfaces can be any suitable interfaces, such as SPI interfaces. The stream trigger interfaces can include any suitable digital circuitry.

The stream parallel processing arrangement can be implemented in the radio context. For example, as illustrated in FIG. 1, each auxiliary stream processor 32, 42, 52 can be for a radio frequency channel, such as a receive channel, a transmit channel, or an observation channel. The auxiliary stream processors can configure hardware registers for radio operation.

The receive channels 14a to 14d include digital circuitry arranged to configure analog components in a receiver of a radio. The receive channels 14a to 14d each include a stream processor 32, a stream trigger interface 34, registers 36, radio event contacts 38, and memory 39 for the stream processor 32. The memory 39 can be random access memory (RAM). The memory 39 can store op codes and data for writing to registers 36. The receive channels 14a to 14d can configure a radio for receiving radio frequency signals.

The transmit channels 16a to 16d include digital circuitry arranged to configure analog components in a transmitter of a radio. The transmit channels 16a to 16d each include a stream processor 42, a stream trigger interface 44, registers 46, radio event contacts 48, and memory 49 for the stream processor 42. The memory 49 can be RAM. The memory 49 can store op codes and data for writing to registers 46. The transmit channels 16a to 16d can configure the radio for transmitting radio frequency signals.

The observation channels 18a to 18b include digital circuitry arranged to configure analog components in observation receive paths of a radio. The observation channels 18a to 18b each include a stream processor 52, a stream trigger interface 54, registers 56, radio event contacts 58, and memory 59 for the stream processor 52. The memory 59 can be RAM. The memory 59 can store op codes and data for writing to registers 56. The observation channels 18a to 18b can configure the radio for observing radio frequency signals.

The stream processor system 10 of FIG. 1 can implement one or more of the following advantages, among others. The stream processor system 10 can implement increased programmability/configurability relative to other systems. For example, even after tape out, modifications can be made that allow for customer specific implementations, such as different power up sequences.

The stream processor system 10 can achieve increased robustness relative to other systems. For example, the stream processors 24, 32, 42, and 52 typically do not crash and can allow for the radio to stay on even if the ARM processor 22 crashes. A baseband processor can provide an input signal to a stream processor via a respective stream trigger interface so that the baseband processor can trigger streams even when the ARM processor 22 is non-operational.

The stream processor system 10 can have improved response time and latency relative to other systems. For example, time critical tasks relating to start-up, transmit, receive, adjustments for overloaded data converters, attenuation changes, power amplifier protection, and/or the like can be performed more quickly and reliably by the stream processor system 10 relative to other systems. Such tasks can be implemented with a fixed and relatively low latency. The latency can be unchanged even as more channels are implemented in a radio system. With the stream processors discussed herein, latency for executing instructions can be deterministic. In some instances, all instructions executed by the stream processor system 10 can have a deterministic latency.

A relatively high level command can trigger relatively complex streams of control that can be managed by the stream processor system. This can enable an external system to control the stream processing system 10 with relatively minimal input.

The stream processing system 10 can efficiently handle interrupts. Interrupts can be queued such that if a second interrupt for an auxiliary stream processor 32, 42, or 52 is received while the auxiliary stream processor is handling a first interrupt, the second interrupt is not lost.

Stream Processors

A stream processor, such as any of the stream processors of the stream processor system 10, can include a program counter (PC) register and/or a data pointer (DP) register to point to locations in memory for an ARM processor. The stream processor can be activated by a writing a particular command to a register of the ARM processor. During operation, the stream processor can successively fetch program words pointed to by the PC and/or data words pointed to by the DP. These fetched words can be stored to a cache for the stream processor. The stream processor can include architectural registers (e.g., 8 16-bit architectural registers), which can be used to provide address and/or data fields. This can save data memory when data is repeated and/or has a relatively simple pattern. A loop instruction can allow counted loops to be realized in program memory. The stream processor can execute instructions to perform one or more of the following operations: arithmetic on data stored in one or more architectural registers, wait for calibration, interrupt the ARM processor, or check register values.

A stream processor can implement various instructions. As an example, certain stream processors can implement 256 instructions. A first type of instructions can be hard wired on the stream processor. The first type of instructions can have dedicated contacts, such as pins, connected to dedicated circuitry arranged to execute such instructions. The first type of instructions can be received at one or more contacts of radio events contacts 38, 48, and/or 58. Instructions with one or more dedicated contacts and/or hardware can be for relatively important and/or time sensitive instructions. For example, instructions to turn ON a receive channel, turn OFF a receive channel, turn ON a transmit channel, turn OFF a transmit channel, and the like are examples of instructions of the first type of instructions. In the example where certain stream processors are arranged to execute 256 instructions, about 30 instructions can be implemented with dedicated circuitry arranged to efficiently implement those instructions in certain instances.

The stream processor can implement a second type of instructions, which are unmapped to specific circuitry of the stream processor, using a serial peripheral interface (SPI) register and circuitry of the stream processor. The second type of instructions can be triggered via a stream trigger interface 26, 34, 44, or 54. The first type of instructions and the second type of instructions can make up most or all of the instructions that the stream processor is arranged to execute.

The auxiliary stream processors 32, 42, and 52 can each provide an event trigger to the main stream processor 24 via a dedicated signal line. The event triggers can provide interrupts to the main stream processor 24. Any suitable number of auxiliary stream processors can be implemented in accordance with the principles and advantages discussed herein. For example, one auxiliary stream processor can be provided per channel as illustrated in FIG. 1.

As shown in FIG. 1, one stream processor is included in each transmit channel 16a to 16d, receive channel 14a to 14d, and observe channel 18a to 18b. In certain instances, all receive and transmit channels can be turned ON and OFF, respectively, at approximately the same time. Each slice stream processor can have unfettered access to a respective memory, such as captive random access memory (RAM). The stream processors can still function if the ARM 22 crashes, and the radio can still function. The main stream processor 24 is included in the digital core 12. Separate interfaces for baseband processor (BBP) and ARM 22 can prevent conflicts and/or race conditions.

High Level Commands

There can typically be more than 1000 regular controls for a radio. The registers that store these controls should be properly configured for the radio to function as desired. The configuration of these registers can change relatively often, such as between time-division duplexing (TDD) transmit and/or receive operations.

In order to streamline the process of configuring radio registers and to implement such functionality in a manner that is transparent to external hardware, sequences that drive the stream processors can be implemented by a high level command. For example, a turn ON command, such as a radio turn ON command, can be provided to the stream processor system 10 to implement a startup process. Streams are also capable of implementing delays and deferred processing. Streams can be used to bring up or down a channel in power sequence operations to avoid transients on the radio frequency (RF) output and/or the power supplies. Using auxiliary stream processors to perform register writes can take advantage of the speed of an internal register bus.

In the stream processor system 10 shown in FIG. 1, a relatively large number (e.g., hundreds or thousands) of writes to registers to control the radio can be abstracted to a relatively simple command. Events in the radio can trigger relatively complex responses from the stream processors in real time. Radio channels can be simultaneously controlled in response to inputs to the stream processor system 10. Timing and sequencing of analog controls can be determined in firmware associated with the part and abstracted away from external (e.g., customer) control specifications.

The stream parallel processing arrangement can have a streamlined startup sequence. A high level command, such as a radio turn ON command, can be provided to the stream processing system 10. Hundreds or thousands of register writes can be performed in response to a single high level command. A baseband processor can provide the high command to the stream processor system 10. The stream processors 24, 32, 42, and 52 can execute a startup process in response to the high level command. This can involve the stream processors 24, 32, 42, and 52 setting radio configuration registers 36, 46, and/or 56.

Other example high level commands include, but are not limited to, commands to change configuration of a digital pre-distortion (DPD) path, commands to update filter coefficients for a receiver and/or a transmitter, commands to update a local oscillator frequency, commands to turn ON a radio channel, commands to turn OFF a radio channel, or the like. As an example, a high level command to change configuration of the DPD path can involve triggering a transmit stream, interrupting the main stream processor 24, and then interrupting the ARM processor 22. As another example, a high level command to change local oscillator frequency can be provided in association with the radio changing from a transmit mode to a receive mode. A stream can be triggered in the main stream processor 24 that can trigger a change in local oscillator frequency.

High level commands can be executed by several instructions executed in parallel by the stream processor system 10. As an example, receive filter coefficients for a plurality of receive channels and/or transmit filter coefficients for a plurality of transmit channels can be updated in parallel. The stream processor system 10 enabling these commands to be executed in parallel can be a significant advantage to having such commands execute in serial. As another example, two high level commands can be provided and executed in parallel with the stream processor system 10. For instance, a configure DPD command and an update filter coefficients command can be received. Related streams can be executed in parallel in the stream processor system 10.

Division of Processing Between ARM and Stream Processors

The stream processor system 10 divides processing between the ARM processor 22 and the stream processors 24, 32, 42, and 52. The ARM processor 22 can execute instructions with longer latency (e.g., a relatively long calibration) and stream processors 24, 32, 42, and 52 can execute instructions with lower latency (e.g., instructions that can respond in real time). The stream processing system 10 can receive input signals at different interfaces for executing instructions on the ARM processor 22 and the stream processors.

Stream processors 24, 32, 42, and/or 52 can process timing sensitive and/or critical instructions. The stream processors 24, 32, 42, 52 can process other lower latency instructions. The stream processors 24, 32, 42, 52 can execute instructions in response to an input signal received at stream trigger interface. Such instructions can be executed by circuitry configured to execute a variety of instructions. The stream processors 32, 42, 52 can execute instructions in response to an input signal received at radio event contacts. Such instructions can be executed by dedicated hardware configured to execute the instructions. Each processing channel (e.g., transmit channel, receive channel, or observation channel) can be controlled by the main stream processor 24 and/or an auxiliary stream processor 32, 42, or 52.

The ARM processor 22 can execute computationally intensive tasks and/or tasks that are not time sensitive. The ARM processor 22 can execute instructions for which there is significant latency for data being ready. The ARM processor 22 can execute instructions in response to an input signal received by a bus for the ARM processor 22. The bus can be an Advanced Microcontroller Bus Architecture High-performance Bus (AHB), for example. The ARM processor 22 can execute instructions in response to an interrupt received from the main stream processor 24 or any of the slice stream processors 32, 42, or 52. The stream processors 24, 32, 42, and 52 can process radio configuration control data. The ARM processor 22 can process other data, such as input data. When there are multiple requests at a given time, the main stream processor 24 can queue the requests without arbitration.

Triggering Streams

Streams can be triggered a variety of ways in the stream processor system 10. The main stream processor 24 can trigger a stream through a stream trigger interface 26, 34, 44, or 54. An example processes of the main stream processor 24 triggering a stream through a stream trigger interface will be described with reference to FIG. 4.

A baseband processor (BBP) can trigger a stream through a stream trigger 26, 34, 44, or 54. An example process of a BBP triggering a stream through a stream trigger interface will be described with reference to FIG. 5.

A slice stream processor can trigger a stream in the main stream processor 24. Such a stream can be triggered via a dedicated signal line between the slice stream processor and the main stream processor 24. An example process of a slice stream processor triggering a main stream processor will be described with reference to FIG. 6.

A slice stream processor can trigger the ARM processor 22 via an interrupt. An example process of a slice stream processor providing an interrupt to the ARM processor will be described with reference to FIG. 7.

The main stream processor 24 can trigger the ARM processor 22 via an interrupt. An example process of the main stream processor 24 providing an interrupt to the ARM processor will be described with reference to FIG. 8.

The ARM processor 22 can trigger a stream in any of the stream processors 32, 42, or 52. The ARM processor 22 can receive a trigger via a bus for the ARM processor 22 (not illustrated in FIG. 1). Example processes of the ARM processor 22 triggering a stream will be described with reference to FIGS. 9 and 10.

A stream can be triggered through radio event contacts 38, 48, or 58. Radio events can trigger one or more streams on slice stream processors. The radio events can be turning on a transmitter, turning on a receiver, or turning on an observation receiver, for example. A pin control interface can trigger such streams. The pin control interface can provide the stream trigger to radio event contacts 38, 48, or 48 to trigger a stream on the stream processor. An example process a radio event triggering a stream on a slice stream processors will be described with reference to FIG. 11.

Radio System

Figure 2:
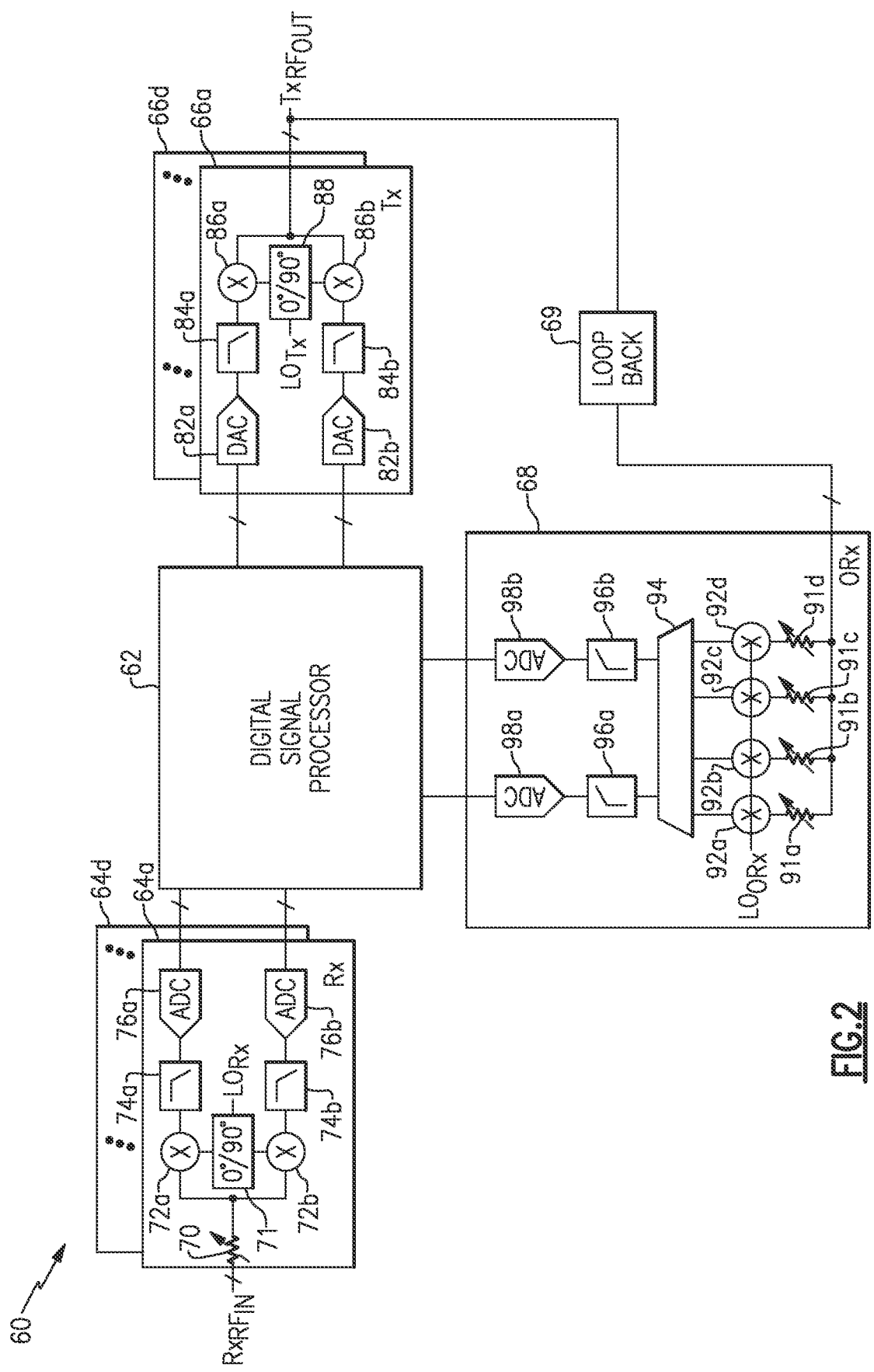
FIG. 2 is a schematic diagram of a radio system that includes a digital signal processor with a distributed processing system according to an embodiment.

FIG. 2 is a schematic diagram of a radio system 60 that includes a digital signal processor 62 with a distributed processing system according to an embodiment. The radio system 60 can be implemented on an integrated circuit. The radio system 60 can be included in a base station. As illustrated, the radio system 60 includes a digital signal processor 62, receivers 64a to 64d, transmitters 66a to 66d, an observation path 68, and a loopback circuit 69 coupled between transmitters 66a to 66d and the observation path 68.

The digital signal processor 62 can include a digital core, digital transmit channels, digital receive channels, and digital observation channels. The digital signal processor 62 can implement any suitable combination of features discussed with reference to FIG. 1. For example, the digital signal processor 62 can include the stream processor system 10 of FIG. 1.

The stream processor system 10 of FIG. 1 can efficiently set configurations for the radio system 60. The registers 36, 46, 56 of the processing channels of the stream processor system 10 can store data to control analog components of the receivers 64a to 64d, the transmitters 66a to 66d, and observation path 68, respectively. For example, the registers 36, 46, and 56 can store filter coefficients for filters 74a and 74b, 84a and 84b, and 96a and 96b, respectively. As another example, registers 36, 46, and 56 can store data to control one or more local oscillator frequencies for upconverting or downconverting signals in the radio system 60. As one more example, registers 36, 46, and 56 can store data to configure (e.g., set a sampling rate of) data converters (e.g., ADCs or DACs).

The receivers 64a to 64d can receive radio frequency signals $RX_{RFIN}$ and provide digital signals to the receive channels of the digital signal processor 62. Each of the receivers 64a to 64d can include an attenuator 70, a quadrature circuit 71 to generate quadrature local oscillator (LO) signals, mixers 72a and 72b, filters 74a and 74b, and analog-to-digital converters (ADCs) 76a and 76b. In an in-phase path, the mixer 72a downconverts the radio frequency input signal $RX_{RFIN}$, the filter 74a filters the output of the mixer 72a, and the ADC 76a converts the output signal from the filter 74a from an analog signal to a digital signal. Similarly, in a quadrature-phase path, the mixer 72b downconverts the radio frequency input signal $RX_{RFIN}$, the filter 74b filters the output of the mixer 72b, and the ADC 76b converts the output signal from the filter 74b from an analog signal to a digital signal. Although the illustrated radio system 60 includes 4 receivers, any suitable number of receivers can be implemented. With the distributed processing systems discussed herein, the number of receivers in the radio system 60 is more scalable than other radio systems.

The transmitters 66a to 66d can receive digital signals from the digital signal processor 62 and provide radio frequency transmit signals $TX_{RFOUT}$ for transmission via an antenna. Each of the transmitters 66a to 66d can include digital-to-analog converters (DACs) 82a and 82b, filters 84a and 84b, mixers 86a and 86b, and a quadrature circuit 88 to generate quadrature LO signals for the mixers 86a and 86b. In an in-phase path, the DAC 82a converts a digital signal from a transmit channel of the digital signal processor 62 to an analog signal, the filter 84a filters the output signal from the DAC 82a, and the mixer 86a upconverts the output signal from the filter 84a to radio frequency. Similarly, in a quadrature-phase path, the DAC 82b converts a digital signal from the digital signal processor 62 to an analog signal, the filter 84b filters the output signal from the DAC 82b, and the mixer 86b upconverts the output signal from the filter 84b to radio frequency. Although the illustrated radio system 60 includes 4 transmitters, any suitable number of transmitters can be implemented. With the distributed processing systems discussed herein, the number of transmitters in the radio system 60 is more scalable than other radio systems.

The observation path 68 can receive a radio frequency signal from one or more transmitters 66a to 66d via the loopback circuit 69. The observation path 68 includes attenuators 91a to 91d, mixers 92a to 92d to downconvert radio frequency signals to baseband, a multiplexer 94, filters 96a to 96b, and ADCs 98a to 98b. Any suitable number of observations paths can be implemented and/or the observation channel can process signals associated with any suitable number of transmitters.

Timing of Radio Channels

Figure 3:
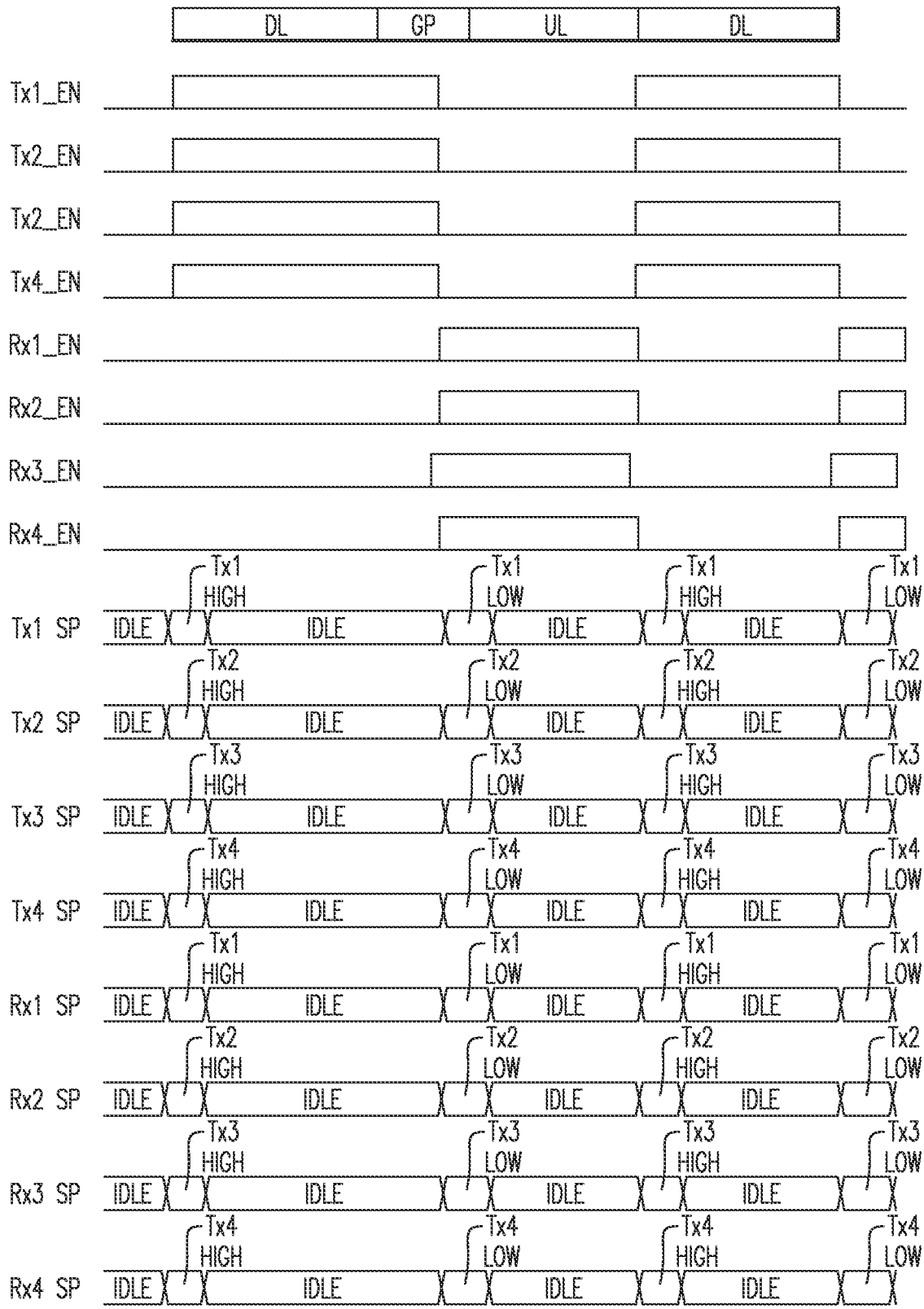
FIG. 3 is a timing diagram for radio control operation of the stream processor system of FIG. 1.

FIG. 3 is a timing diagram for radio control operation of the stream processor system 10 of FIG. 1. The signals TX1_EN to TX4_EN and RX1_EN to RX4_EN can be provided to pins of respective stream trigger interfaces 34 and 44 of the stream processor system 10 and/or to pins of respective radio events contacts 38 and 48. These pins can be connected to the stream processors 32 or 42 via digital circuitry. Streams in the transmit channels can be active concurrently. Streams in the receive channels can be active concurrently.

As shown in FIG. 3, transmit channels and receive channels can be triggered in parallel with each other. In the example of FIG. 3, 8 streams can be triggered in parallel. Each of these streams can be completed within a deterministic duration after the radio event trigger. The streams can be completed at approximately the same time (e.g., in the same number of cycles or within a few cycles of each other).

Example Use Cases for Stream Processing System

The stream processor system 10 of FIG. 1 can implement a variety of functionalities. Examples use cases will be described with reference to the flow diagrams of FIGS. 4 to 11. These examples include various masters (e.g., a baseband processor, a main stream processor, a slice stream processor, an ARM processor, or a radio event), various processors executing instructions (e.g., a slice stream processor, a main stream processor, and/or an ARM), and various trigger types (e.g., a pin control interface, a stream trigger interface, an interrupt, a bus for an ARM processor). These processes can be performed in the context of the radio system 60 of FIG. 2 using the stream processor system 10 of FIG. 1. Accordingly, reference may be made to elements of the stream processor system 10. The operations of any of the processes discussed below can be performed in any other suitable system. Moreover, the operations of any of the processes discussed below can be performed in any suitable order that is technically feasible and certain operations can be implemented in parallel as appropriate.

Figure 4:
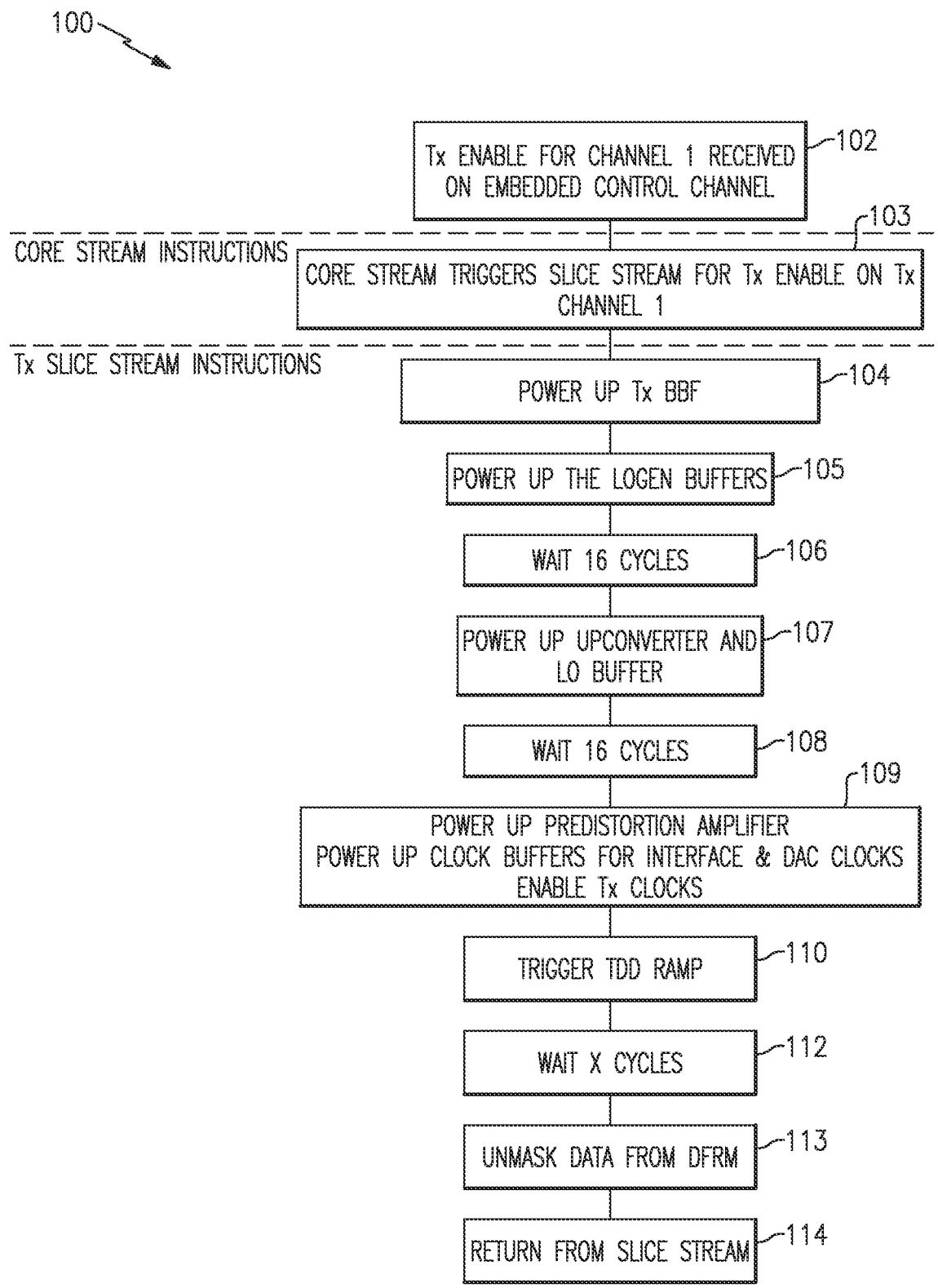
FIG. 4 is a flow diagram of a process in which a main stream processor triggers an auxiliary stream processor in response to a radio channel being turned on according to an embodiment.

FIG. 4 is a flow diagram of a process 100 in which a main stream processor triggers a slice stream processor in response to a radio channel being turned ON. The process 100 involves a main stream processor 24 triggering a transmit channel stream processor 42 in response to a transmit channel being enabled. Similar functionalities can be implemented in other radio channels in response to a receive channel and/or an observation channel being turned ON.

During initialization of a device under test (DUT), a JESD control channel can be configured to accept transmit/receive/ observation receive enables. A link can be configured and made active. At block 102, a transmit enable for transmit channel 1 can be received. The transmit enable can correspond to the TX1_EN signal of FIG. 3 being asserted (e.g., transitioning from low to high in FIG. 3). The transmit enable signal can be received on an embedded control channel. A baseband processor can provide the transmit enable signal to a stream trigger interface 26 of the digital core 12 of the stream processor 10 of FIG. 1. This can cause several other operations of the process 100 to be performed. Thus, a high level command provided to the stream processor system 10 can result in a number of operations being performed in a radio system 60.

In response to the transmit enable signal TX1_EN being asserted, the main stream processor 24 can trigger a stream in the stream processor 42 of a first transmit channel 16a at block 103. The stream in the first transmit channel 16a can be triggered by the main stream processor 24 triggering the stream processor 42 via the stream trigger interface 44.

The transmit slice stream processor 42 executes instructions in response to a trigger from the main stream processor 24. The operations at blocks 104-114 can be controlled by the stream processor 42. The stream processor 42 can cause a transmit baseband filter 84a/84b of the transmitter 66a of FIG. 2 to power up at block 104. A baseband filter flicker noise amplifier can also be powered up. At block 105, the stream processor 42 can power up the local oscillator generator buffers. The system can wait for a period of time, such as 16 cycles, at block 106. Then the upconverter mixers 86a and 86b of FIG. 2 and local oscillator buffer can be powered up at block 107. The system can wait for a period of time, such as 16 cycles, at block 108.

More circuit components, including pre-distortion amplifier and clock buffers for interface and DAC clocks, can be powered up at block 109. Transmit clocks can also be enabled at block 109.

At block 110, a time-division duplexing ramp can be triggered. The system can wait for a number of cycles, such as 64 cycles, at block 112. Data can be unmasked from DRFM at block 113. Then the slice processor 42 can provide a return at block 114. This can indicate that the radio system 60 is configured for transmission.

Figure 5:
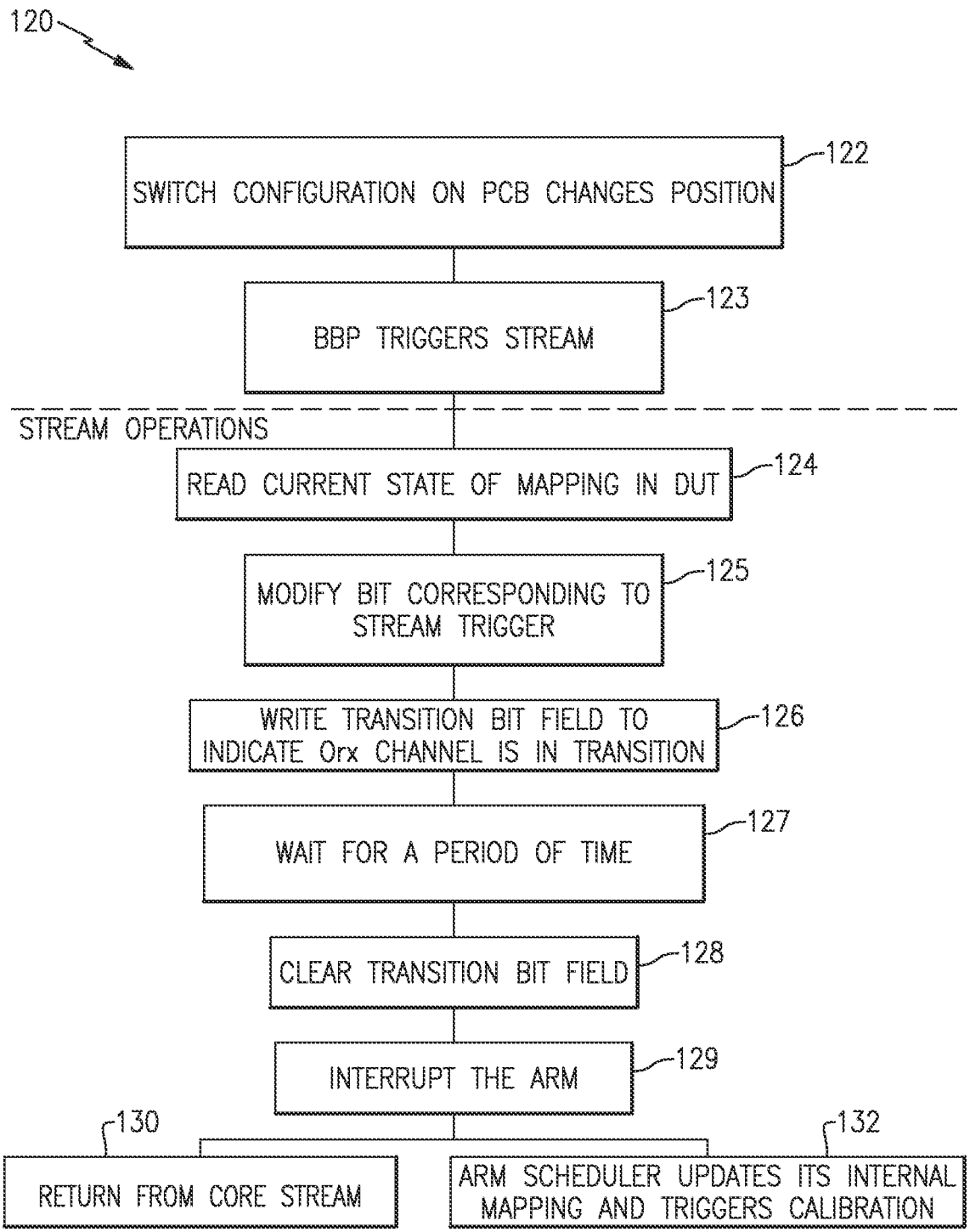
FIG. 5 is a flow diagram of a process of a main stream processor being triggered by a baseband processor via a stream trigger interface according to an embodiment.

FIG. 5 is a flow diagram of a process 120 of a main stream processor being triggered by a baseband processor via a stream trigger interface. This is one example of a process of a baseband processor triggering a main stream processor. The process 120 involves a baseband processor triggering a main stream processor in response to a state of a switch on a printed circuit board toggling.

A default mapping for an initial polarity of switches on a printed circuit board can be configured to initialize a DUT. At block 122, a switch configuration on a printed circuit board changes position. For example, a particular switch can change from an ON position to an OFF position. This can cause a baseband processor of the digital signal processor 62 of FIG. 2 to trigger a stream at block 123. The stream corresponds to the particular switch position toggling. The stream can be triggered by the baseband processor providing an input signal to the stream trigger interface 26 to initiate the stream in the main stream processor 24 of FIG. 1.

In the stream, a current state of mapping in the DUT can be read at block 124. Then a bit corresponding to the particular switch toggling can be modified at block 125. A transition bit field can be written to indicate that a radio channel, such as an observation receive channel, is in transition at block 126. At block 127, the stream can wait for a period of time, such as about 2 microseconds. Then the transition bit field can be cleared at block 128. An interrupt can be sent to the ARM processor 22 at block 129. A return can be provided by a main stream processor at block 130. At block 132, an ARM scheduler updates its internal mapping and triggers calibration.

Figure 6:
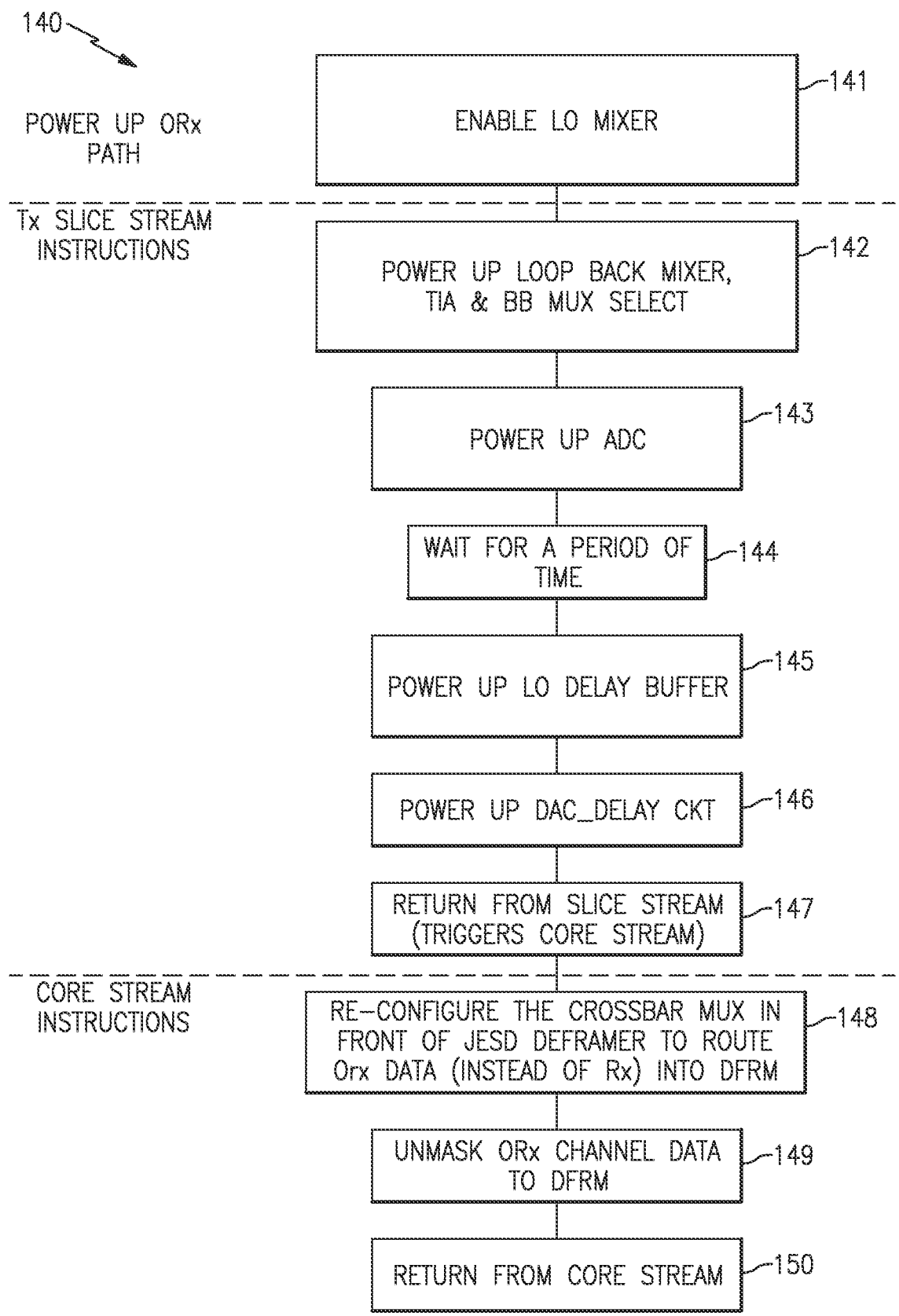
FIG. 6 is a flow diagram of a process of a slice stream processor triggering a main stream processor according to an embodiment.

FIG. 6 is a flow diagram of a process 140 of a slice stream processor triggering a main stream processor. The process 140 involves a radio event, such as a JDESD link sharing configuration, to cause the auxiliary stream processor, such as the transmit channel stream processor 42, to trigger the main stream processor 24. The trigger in the process 140 can be considered a direct trigger.

At block 141, an observation receive path 68 can be powered. A local oscillator mixer can be enabled in powering up the observation receive path 68.

A transmit channel stream processor 42 can execute instructions in response to an input signal received at radio events contacts 48. Various circuitry, such as a loop back mixer, transimpedance amplifier and baseband multiplexer selects, can be powered up at block 142. An ADC can be powered up at block 143. Then the system can wait for a period of time, such as about 1 microsecond, at block 144. At block 145, a local oscillator delay buffer can be powered up. A DAC delay circuit can be powered up at block 146. Accordingly, a radio system can be ready for the observation path to observe a transmit path. The stream processor 42 can send a return at block 147. This can trigger the main stream processor 24. An event trigger signal can be sent from the stream processor 42 to the main stream processor 24 via a dedicated signal line.

The main stream processor 24 can execute instructions in response to an event trigger from the stream processor 42 in the transmit channel. At block 148, a multiplexer can be re-configured to route observation receive data (instead of receive data) to digital radio frequency memory (DRFM). The observation channel data can be unmasked to DRFM at block 149. Then at block 150 a return can be provided by the main stream processor 24.

Figure 7:
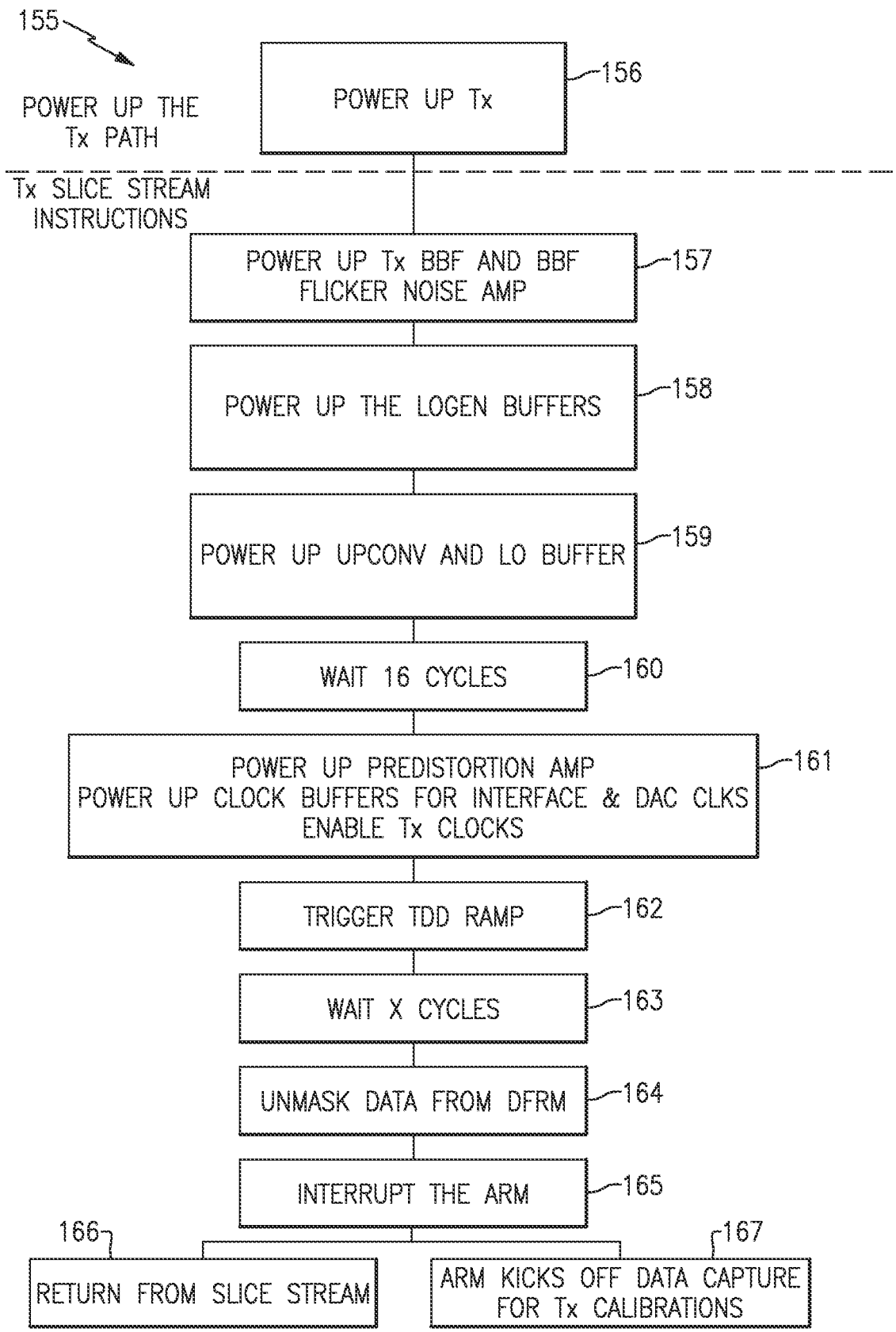
FIG. 7 is a flow diagram of a process of a slice stream processor interrupting an advanced reduced instruction set computer machine (ARM) processor according to an embodiment.

FIG. 7 is a flow diagram of a process 155 of a slice stream processor interrupting an ARM processor. The process 155 involves a radio channel stream processor, such as a transmit channel stream processor, sending an interrupt to an ARM processor in response to the radio channel turning on. This can re-start tracking calibrations.

At block 156, a transmit path is powered up. This can set the transmit path into an initial configuration.

A transmit channel stream processor 42 can execute instructions and provide an interrupt to the ARM processor 22. The stream processor 42 can power up analog circuitry of a transmitter 66a. The stream processor 42 can execute instructions to cause a transmit baseband filter 84a/84b to be powered up at block 157. Baseband filter flicker noise amplifiers can also be powered up. Local oscillator generator buffers can be powered at block 158. An upconverter 86a/86b and local oscillator buffer can be powered up at block 159. The system can wait for a period of time, such as 16 cycles, at block 160. Then additional circuitry can be powered up at block 161. The additional circuitry can include a pre-distortion amplifier, clock buffers for interface and DAC clocks, and enable circuitry for transmit clocks. At block 162, a TDD ramp can be triggered. The system can wait for another period of time (e.g., 64 cycles) at block 163. Data can be unmasked from DRFM at block 164.

The transmit channel stream processor 42 can send an interrupt to ARM processor 22 at block 165. The interrupt can be provided via a dedicated signal line. The stream processor 42 can provide a return at block 166. This can indicate that the stream processor 42 is done executing the stream. The ARM processor 22 can initiate data capture for transmit calibrations at block 167 in response to receiving the interrupt.

Figure 8:
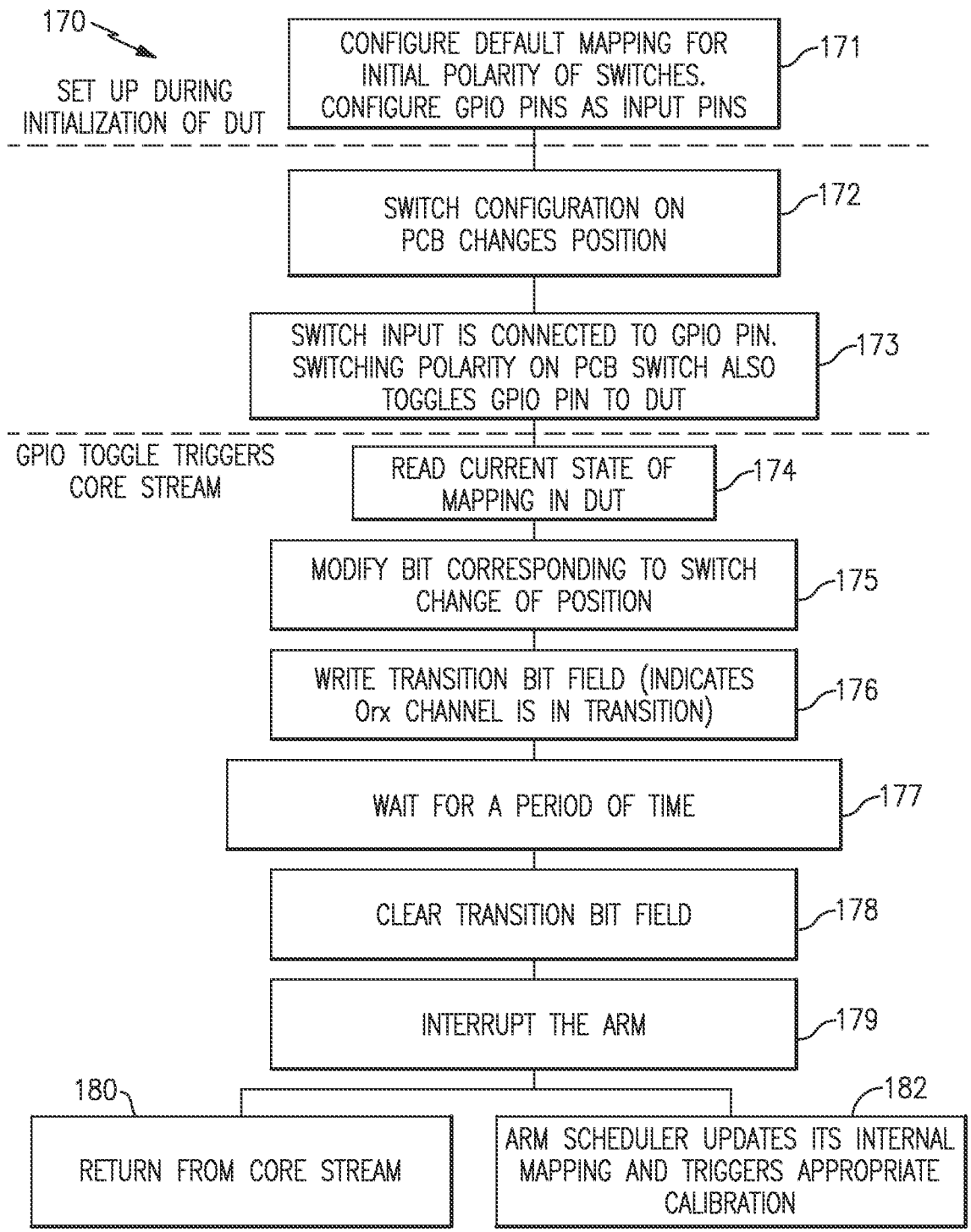
FIG. 8 is a flow diagram of a process of a main stream processor interrupting an ARM processor according to an embodiment.

FIG. 8 is a flow diagram of a process 170 of a main stream processor interrupting an ARM processor. In the process 170, a polarity of a switch in a front end on a printed circuit board can change state. This can pause calibration and/or abort calibration on the ARM processor of a stream processor system.

A DUT can be initialized. A default mapping for an initial polarity of switches on a printed circuit board can be configured to initialize the DUT at block 171. General purpose input/output (GPIO) pins can be configured as input pins at block 171.

At block 172, a switch configuration on a printed circuit board changes position. For example, a particular switch can change from an ON position to an OFF position. The particular switch can be included in a radio frequency front end. An input of the particular switch can be connected to a GIPO pin. Toggling the polarity of the particular switch can also toggle a GPIO pin to the DUT at block 173. The GIPO toggle can trigger a stream on the main stream processor 24 of FIG. 1.

In the stream on the main stream processor 24, a current state of mapping in the DUT can be read at block 174. Then one or more bits corresponding to the particular switch toggling can be modified at block 175. A transition bit field can be written to indicate that a radio channel, such as an observation receive channel, is in transition at block 176. At block 177, the stream can wait for a period of time, such as about 2 microseconds. Then the transition bit field can be cleared at block 178. An interrupt can be sent from the main stream processor 124 to the ARM processor 22 at block 179. A return can be provided by a main stream processor at block 180. This can indicate that the main stream processor 24 is done executing the stream. At block 182, an ARM scheduler updates its internal mapping and triggers calibration in response to receiving the interrupt.

Figure 9:
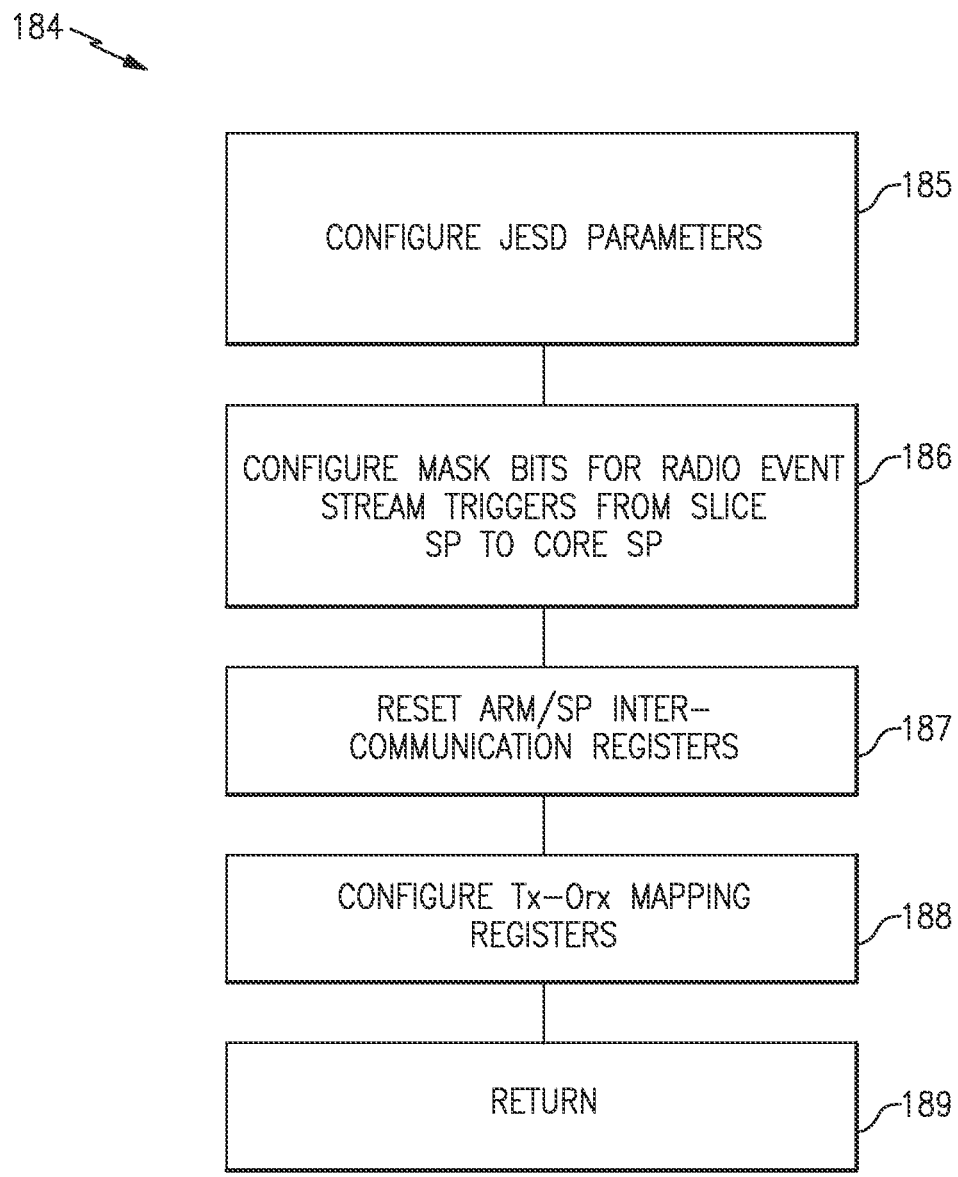
FIG. 9 is a flow diagram of a process of an initialization stream called by an ARM processor according to an embodiment

FIG. 9 is a flow diagram of a process 184 of an initialization stream called by an ARM processor according to an embodiment. In the process 184, an ARM processor triggers a main stream processor in an initialization and/or power up. The stream can be triggered using a bus for the ARM processor. The bus can be an Advanced Microcontroller Bus Architecture High-performance Bus (AHB), for example.

At block 185, JESD parameters are configured. The JESD parameters can be use case specific. Mask bits can be configured for radio event triggers from a slice stream processor to a main stream processor at block 186. ARM/stream processor intercommunication registers can be reset at block 187. Transmit-observation receive mapping registers can be configured at block 188. At block 189, a return can be provided.

Figure 10:
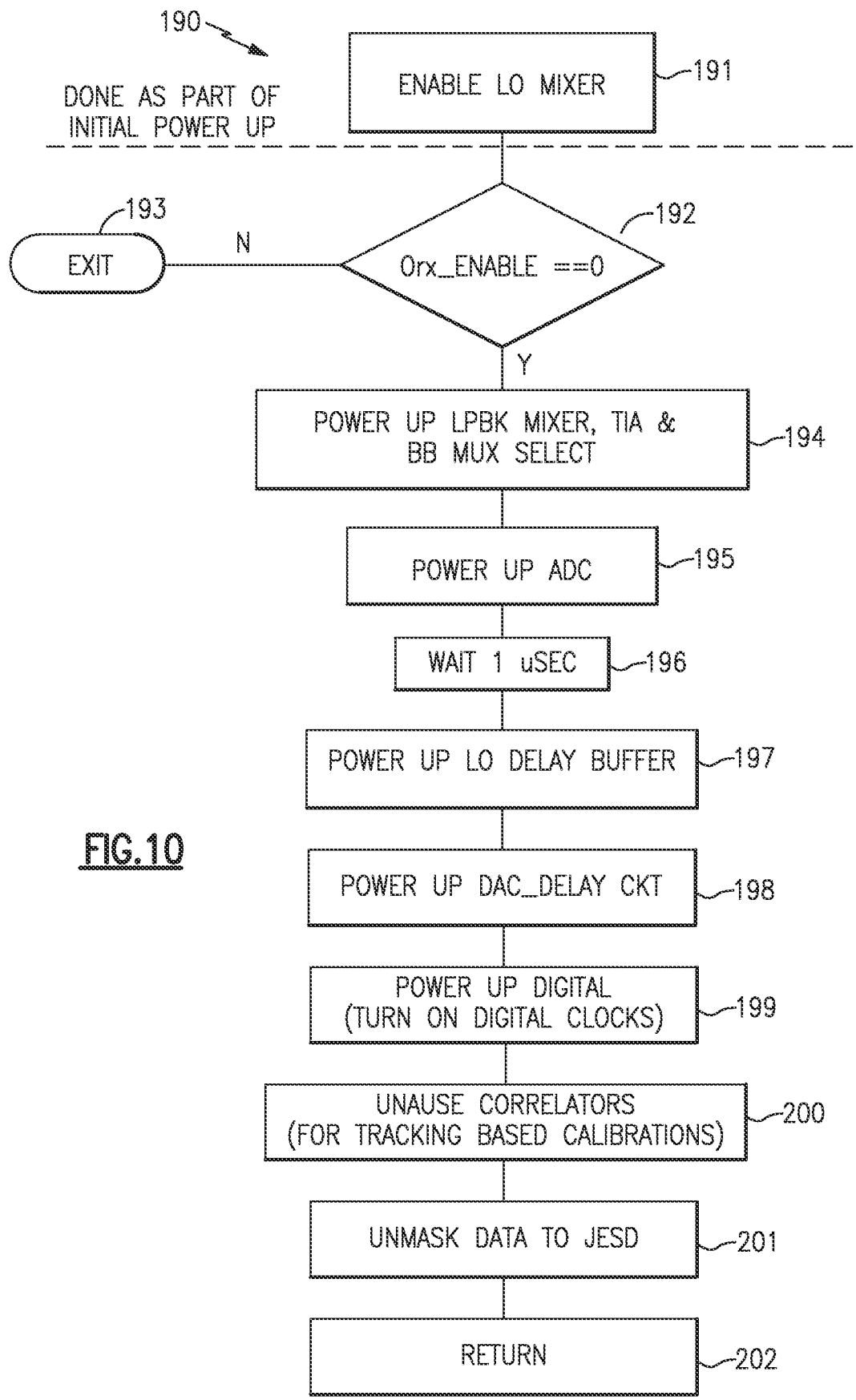
FIG. 10 is a flow diagram of a process of an ARM processor triggering a stream in a slice stream processor according to an embodiment.

FIG. 10 is a flow diagram of a process 190 of an ARM processor triggering a stream in a slice stream processor according to an embodiment. In the process 190, an observation receive/loopback path for transmit loopback calibration is configured. The stream can be triggered using a bus, such as an AHB, of the ARM processor At block 191, a local oscillator mixer is enabled. This can be done as part of initial power up. It is determined whether the observation receiver is enabled at decision block 192. In response to determining that the observation receiver is enabled, the process 190 can exit at block 193. In response to determining that the observation receiver is not enabled, the process 190 proceeds with configuring an observation path for transmit loopback calibration.

Analog components of an observation receive path can be configured by a slice stream processor 52 of an observation channel 18a. A loop back mixer, transimpedance amplifier and baseband multiplexer selects can be powered up at block 194. An ADC can be powered up at block 195. Then the system can wait for a period of time, such as about 1 microsecond, at block 196. At block 197, a local oscillator delay buffer can be powered up. A DAC delay circuit can be powered up at block 198. Digital circuitry can be powered up at block 199. This can involve turning on digital clocks. Correlators for tracking based calibrations can be unpaused at block 200. JESD data can be unmasked at block 201. A return can be provided by the slice stream processor 52 at block 202. This can indicate that the observation receive path is ready for transmitter loopback calibrations.

Figure 11:
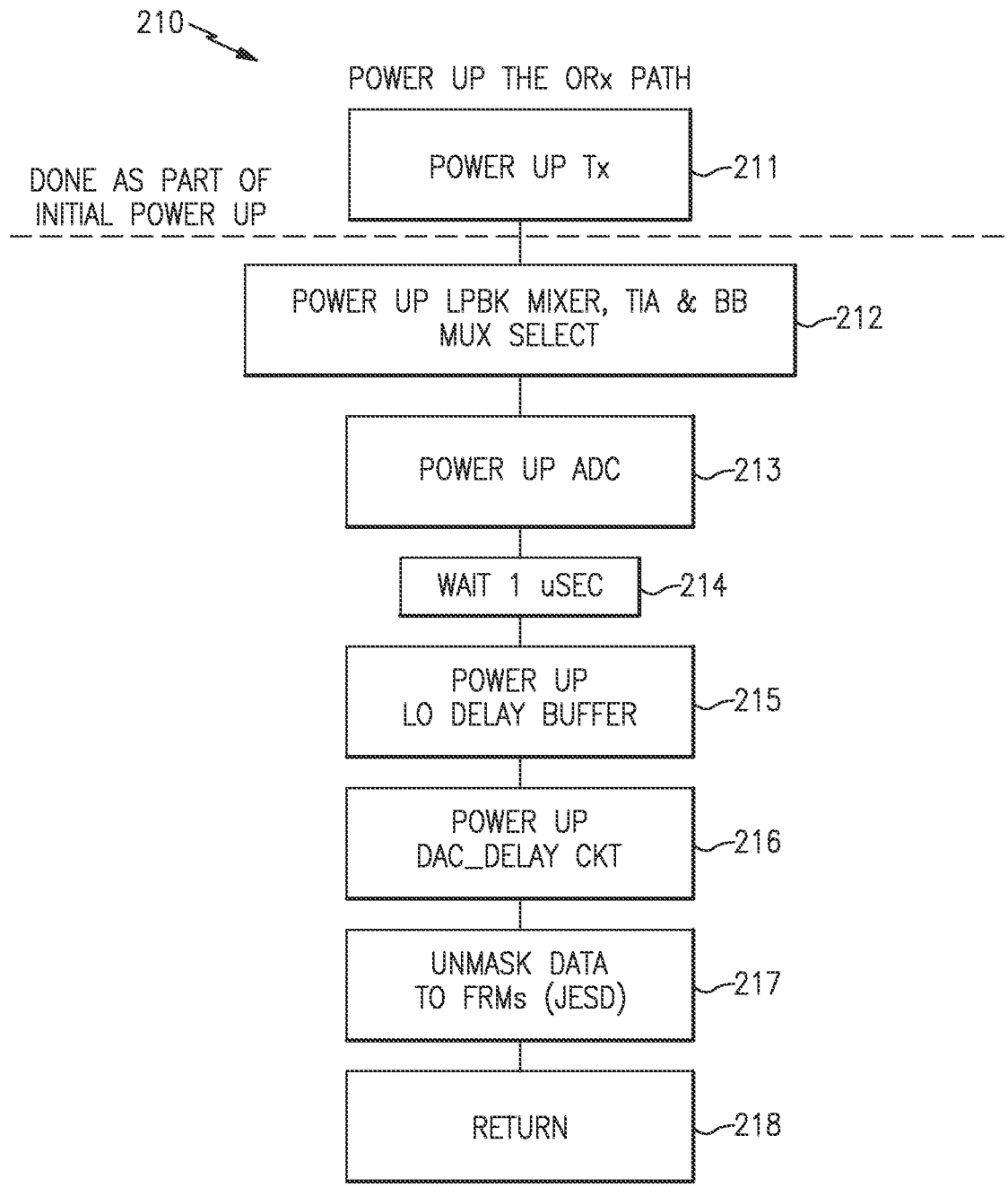
FIG. 11 is a flow diagram of a process of a radio event triggering a slice stream processor for powering up an observation path.
Figure 12:
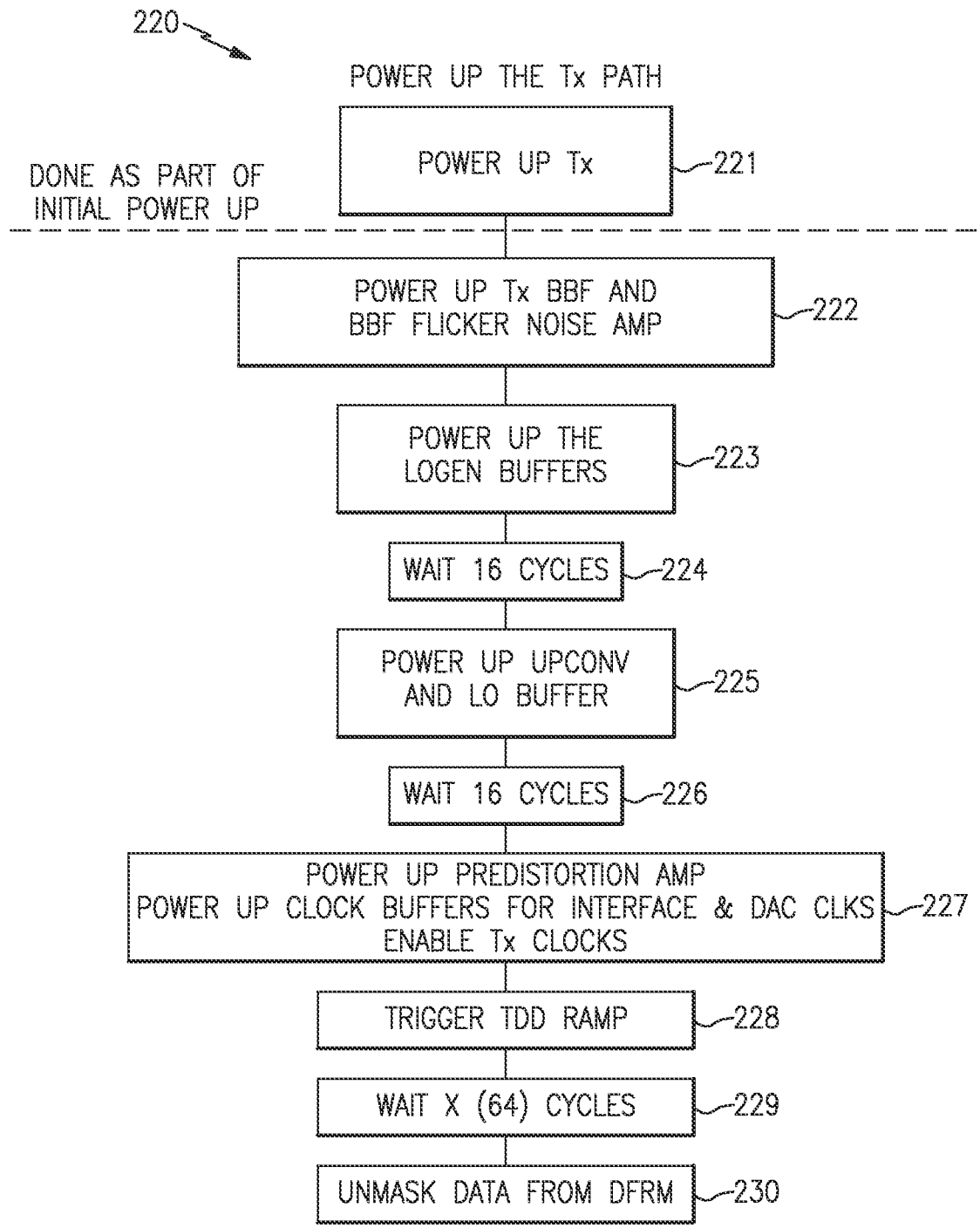
FIG. 12 is a flow diagram of a process of a radio event triggering a slice stream processor for powering up a transmit path.

Radio events can trigger slice stream processors via a pin control interface. This can turn ON a radio channel (e.g., a transmit channel, a receive channel, or an observation channel). FIG. 11 is a flow diagram of a process 210 of powering up an observation path. The FIG. 12 is a flow diagram of powering up a transmit path. In these processes, slice stream processors can be triggered though the pin control interface without the ARM processor or the main stream processor triggering the slice stream processor.

FIG. 11 is a flow diagram of a process 210 of a radio event triggering a slice stream processor for powering up an observation path. At block 211, an observation receive path 68 can be powered up. A local oscillator mixer can be enabled in powering up the observation receive path 68.

The slice stream processor 52 can execute instructions in response to an input signals received at radio events contacts. The slice stream processor 52 can be triggered by an input signal received at radio event contacts 58 of the observation channel 18a. The slice stream processor 52 can configure analog components on the observation receive path. A loop back mixer, transimpedance amplifier and baseband multiplexer selects can be powered up at block 212. An ADC can be powered up at block 213. Then the system can wait for a period of time, such as about 1 microsecond, at block 214. At block 215, a local oscillator delay buffer can be powered up. A DAC delay circuit can be powered up at block 216. Data can be unmasked to FRMs at block 217. Then at block 218 a return can be provided by the slice stream processor 52.

FIG. 12 is a flow diagram of a process 220 of a radio event triggering a slice stream processor for powering up a transmit path. The slice stream processor 42 can be triggered by an input signal received at radio event contacts 48 of the transmit channel 16a. At block 221, a transmit path is powered up. This can set the transmit path into an initial configuration. A slice stream processor 42 can execute instructions to configure the transmit path for transmission. The slice stream processor 42 can execute instructions to cause a transmit baseband filter 84a/84b to be powered up at block 222. Baseband filter flicker noise amplifiers can also be powered up. Local oscillator generator buffers can be powered at block 223. The system can wait for a period of time, such as 16 cycles, at block 224. Then an upconverter 86a/86b and local oscillator buffer can be powered up at block 225. The system can wait for a period of time, such as 16 cycles, at block 226. Then additional circuitry can be powered up at block 227. The additional circuitry can include a pre-distortion amplifier, clock buffers for interface and DAC clocks, and enable circuitry for transmit clocks. At block 228, a TDD ramp can be triggered. The system can wait for another period of time (e.g., 64 cycles) at block 229. Data can be unmasked from DRFM at block 230.

Additional Stream Processor Systems

Figure 13:
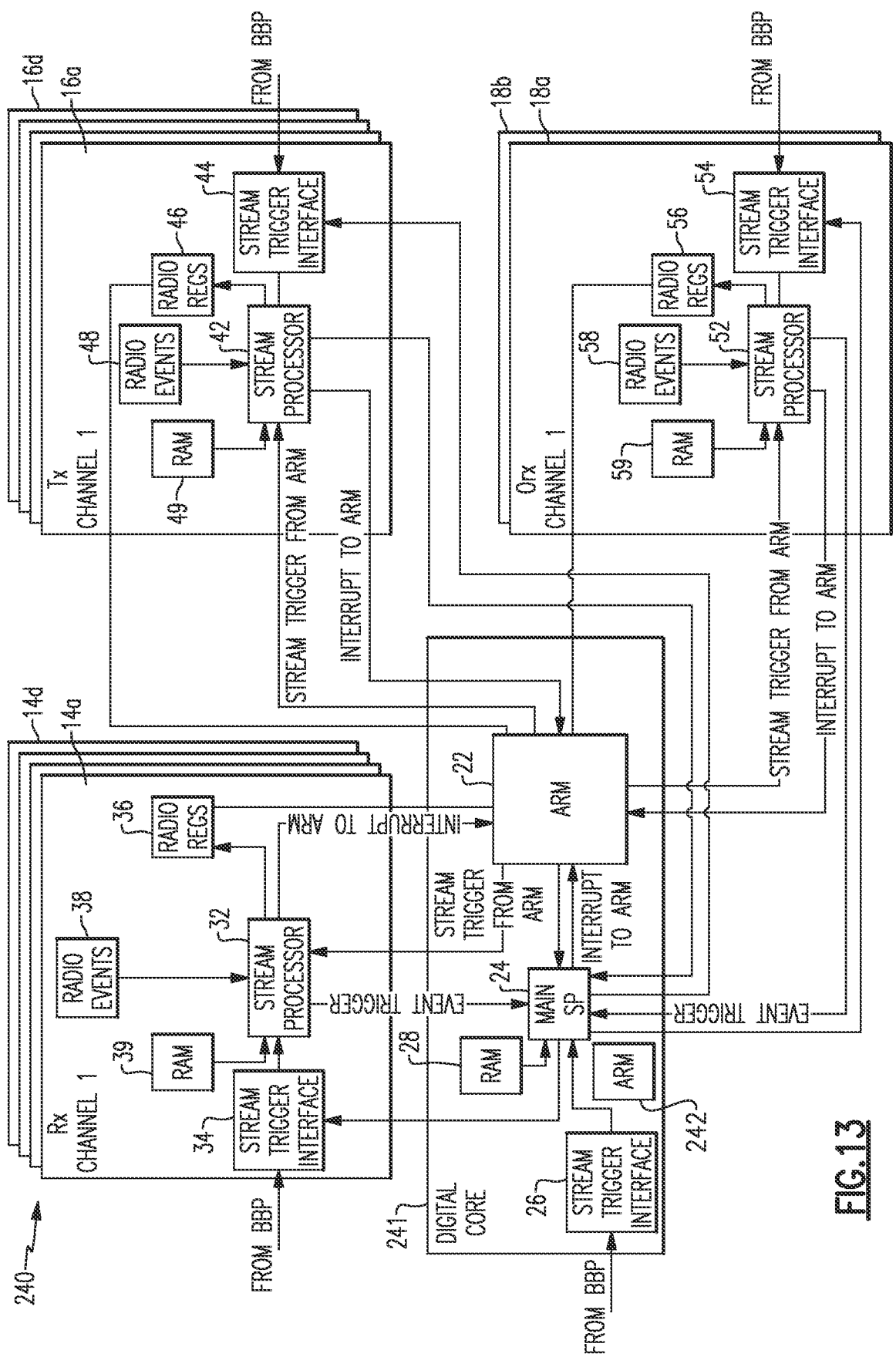
FIG. 13 is a schematic block diagram of a stream processor system according to an embodiment.
Figure 14:
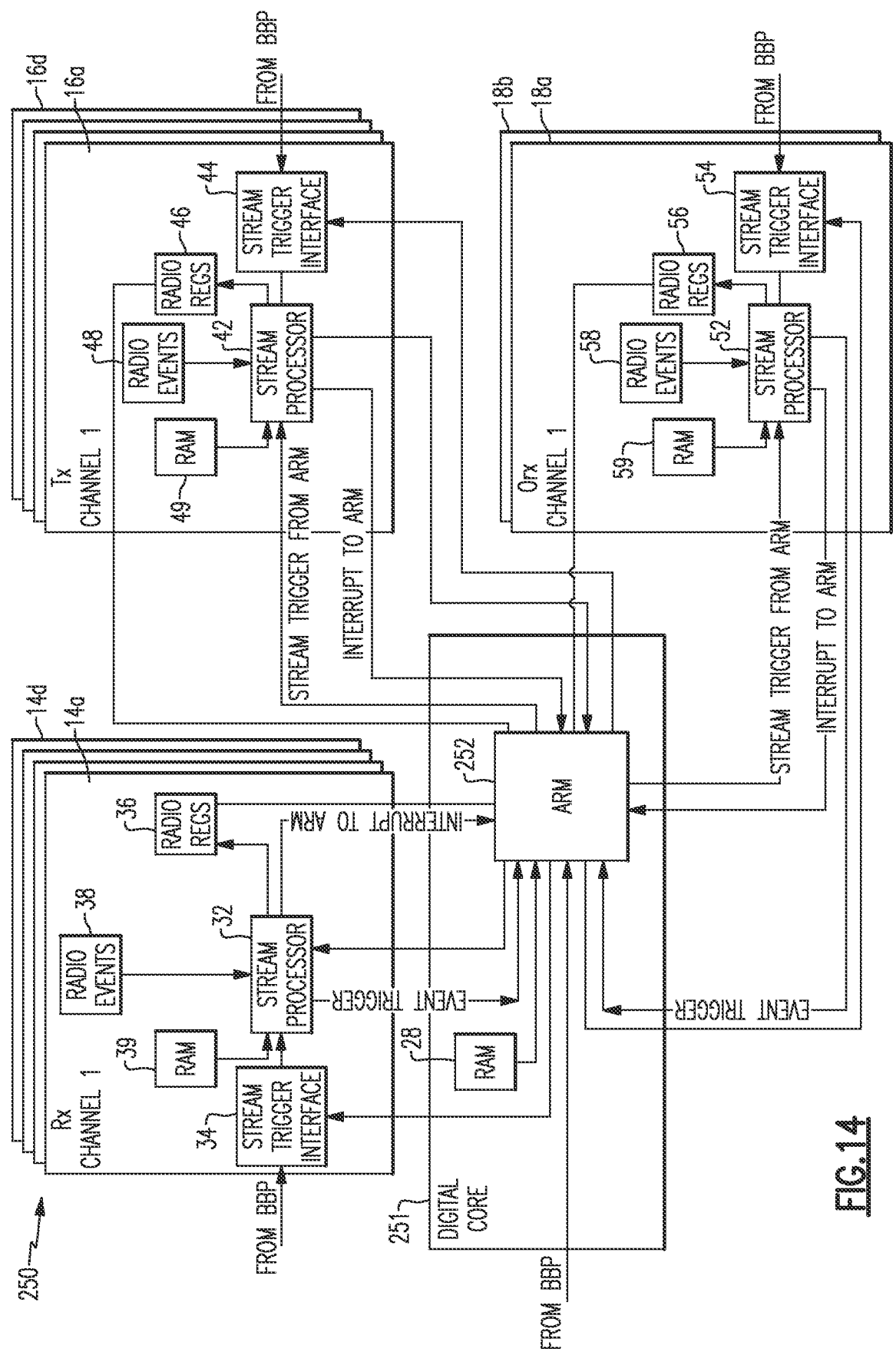
FIG. 14 is a schematic block diagram of a stream processor system according to another embodiment.

Although embodiments may be discussed above with reference to the stream processor system 10 of FIG. 1, other stream processor systems can implement any suitable principles and advantages discussed herein. For example, a stream processor system can include more than one ARM processor. FIG. 13 illustrates an example stream processor system that includes two ARM processors. As another example, a stream processor system can be implemented with an ARM processor and stream processors for processing channels and without a main stream processor. FIG. 14 illustrates an example stream processor system with such features. The principles and examples of the example stream processing systems of FIGS. 13 and 14 can be applied to any other suitable distributed processing systems that include a main processor and co-processors.

FIG. 13 is a schematic block diagram of a stream processor system 240 according to an embodiment. The stream processor system 240 is like the stream processor system 10 of FIG. 1, except that the digital core 241 includes an additional ARM processor 242 relative to the digital core 12 of FIG. 1. The additional ARM processor 242 can be configured to execute instructions for particular tasks, which can be computation intensive. As an example, the ARM processor 242 can be configured to execute digital pre-distortion (DPD) functions. The ARM processor 242 can be any suitable processor, such as an ARM M3 processor or an ARM M4 processor.

FIG. 14 is a schematic block diagram of a stream processor system 250 according to another embodiment. The stream processor system 250 is like the stream processor system 10 of FIG. 1, except that the digital core 251 does not include a main stream processor and connections among components are adjusted accordingly relative to the stream processor system 10. Functions of the main stream processor of the stream processor system 10 can be executed by the ARM processor 252 in the stream processor system 250. The ARM 252 can receive event triggers from stream processors in processing channels. The ARM 252 can trigger streams in the stream processors in processing channels.

CONCLUSION

Any of the principles and advantages discussed herein can be applied to other systems, devices, integrated circuits, electronic apparatus, methods, not just to the embodiments described above. The elements and operations of the various embodiments described herein can be combined to provide further embodiments. The principles and advantages of the embodiments can be used in connection with any other systems, devices, integrated circuits, apparatus, or methods that could benefit from any of the teachings herein.

Unless the context indicates otherwise, throughout the description and the claims, the words "comprise," "comprising," "include," "including," and the like are to generally be construed in an inclusive sense, as opposed to an exclusive or exhaustive sense; that is to say, in the sense of "including, but not limited to." The word "coupled," as generally used herein, refers to two or more elements that may be either directly coupled to each other, or coupled by way of one or more intermediate elements. Likewise, the word "connected," as generally used herein, refers to two or more elements that may be either directly connected, or connected by way of one or more intermediate elements. Additionally, the words "herein," "above," and words of similar import, when used in this application, shall refer to this application as a whole and not to any particular portions of this application. Where the context permits, words in the above Detailed Description using the singular or plural number may also include the plural or singular number respectively. Where the context permits, the word "or" in reference to a list of two or more items is intended to cover all of the following interpretations of the word: any of the items in the list, all of the items in the list, and any combination of the items in the list.

Moreover, conditional language used herein, such as, among others, "can," "could," "might," "may," "e.g.," "for example," "such as" and the like, unless specifically stated otherwise or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments.

While certain embodiments have been described, these embodiments have been presented by way of example, and are not intended to limit the scope of the disclosure. Indeed, the novel methods, apparatus, and systems described herein may be embodied in a variety of other forms. Furthermore, various omissions, substitutions and changes in the form of the methods, apparatus, and systems described herein may be made without departing from the spirit of the disclosure. For example, circuit blocks and/or circuit elements described herein may be deleted, moved, added, subdivided, combined, and/or modified. Each of these circuit blocks and/or circuit elements may be implemented in a variety of different ways.

What is claimed is:

1. A stream processing system for configuring multiple processing channels, the stream processing system comprising:
   a main stream processor; and
   a plurality of processing channels comprising:
      a first processing channel comprising first registers and a first stream processor, the first stream processor configured to receive a first trigger from the main stream processor that causes the first stream processor to execute a first set of instructions that include at least one instruction to access at least one of the first registers; and
      a second processing channel comprising second registers and a second stream processor, the second stream processor configured to receive a second trigger from the main stream processor that causes the second stream processor to execute a second set of instructions that include at least one instruction to access at least one of the second registers, wherein the second stream processor is configured to trigger a stream in the main stream processor to access one or more of the first registers of the first processing channel, and wherein the first stream processor and the second stream processor are programmable.

2. The stream processing system of claim 1, wherein all instructions of the first and second sets of instructions are executed with deterministic latency.

3. The stream processing system of claim 1, wherein the first processing channel comprises a trigger interface configured to receive an input signal from external to the stream processing system and cause the first stream processor to execute a set of instructions in response to receiving the input signal.

4. The stream processing system of claim 3, further comprising another trigger interface configured to receive another input signal from external to the stream processing system and cause the main stream processor to initial a stream in the main stream processor in response to receiving the another input signal.

5. The stream processing system of claim 1, wherein the first stream processor is configured to execute a subset of instructions executable by the first stream processor using dedicated circuitry.

6. The stream processing system of claim 1, wherein main stream processor has access to the first registers of the first processing channel and the second registers of the second processing channel.

7. The stream processing system of claim 1, wherein the main stream processor is configured to queue multiple requests for at least the first stream processor and the second stream processor.

8. The stream processing system of claim 1, wherein the first stream processor and the second stream processor are each configured to provide an event trigger to the main stream processor via a respective dedicated signal line.

9. The stream processing system of claim 1, wherein the first processing channel is a transmit channel of a transceiver, the second processing channel is a receive channel of the transceiver, and the registers of the first registers and the second registers control radio operations.

10. The stream processing system of claim 1, wherein the second stream processor is configured to execute the second set of instructions in parallel with the first stream processor executing the first set of instructions.

11. A method of executing instructions in a stream processing system, the method comprising:
   executing a first set of instructions with a first stream processor of a first radio channel in response to a first trigger from a main stream processor, the first set of instructions including at least one instruction to access at least one register of the first radio channel;
   executing a second set of instructions with a second stream processor of a second radio channel in response to a second trigger from the main stream processor, the second set of instructions including at least one instruction to access at least one register of the second radio channel, wherein the first stream processor and the second stream processor are programmable, and wherein registers of the first radio channel and registers of the second radio channel control radio operations; and
   triggering, using the second stream processor, a stream in the main stream processor to access one or more registers of the first radio channel.

12. The method of claim 11, wherein the first set of instructions and the second set of instructions are executed with deterministic latency.

13. The method of claim 11, further comprising executing a third set of instructions with the first stream processor in response to receiving an input signal from external to the stream processing system at a trigger interface of the first radio channel.

14. The method of claim 11, further comprising queuing, by the main stream processor, multiple requests for at least the first stream processor and the second stream processor.

15. The method of claim 11, further comprising:
   receiving, by the stream processing system, a high level command; and
   writing to at least one hundred registers of the first and second radio channels in response to receiving the high level command.

16. The method of claim 15, wherein the high level command is a radio turn on command, and the writing to at least one hundred registers is included in a startup sequence performed in response to receiving the high level command.

* * * * *